United States Patent
Hertel et al.

(10) Patent No.: US 11,825,787 B2
(45) Date of Patent: Nov. 28, 2023

(54) CONTROLLER-OPERATED VERTICAL FARMING SYSTEM USING TRANSPORTABLE MODULES

(71) Applicant: Cloud Produce Inc., Belmont, CA (US)

(72) Inventors: Philipp Hertel, Belmont, CA (US); Ian Mathieson, Victoria (CA)

(73) Assignee: Cloud Produce Inc., Belmont, CA (US)

( * ) Notice: Subject to any disclaimer, the term of this patent is extended or adjusted under 35 U.S.C. 154(b) by 0 days.

(21) Appl. No.: 17/940,644

(22) Filed: Sep. 8, 2022

(65) Prior Publication Data

US 2023/0073964 A1 Mar. 9, 2023

Related U.S. Application Data

(60) Provisional application No. 63/345,283, filed on May 24, 2022, provisional application No. 63/241,915, filed on Sep. 8, 2021.

(51) Int. Cl.
*A01G 31/06* (2006.01)
*A01G 31/00* (2018.01)

(52) U.S. Cl.
CPC ........ *A01G 31/06* (2013.01); *A01G 2031/006* (2013.01)

(58) Field of Classification Search
CPC ............ A01G 31/045; A01G 2031/006; A01G 31/02; A01G 31/04; A01G 31/042; A01G 31/06; A01G 27/003; A01G 9/023; Y02P 60/21
See application file for complete search history.

(56) References Cited

U.S. PATENT DOCUMENTS

| 3,824,736 A * | 7/1974 | Davis ..................... A01G 7/045 |
| | | 47/17 |
| 11,219,194 B1 * | 1/2022 | Malone ................... C02F 3/087 |
| 2018/0014486 A1 * | 1/2018 | Creechley .............. A01G 9/249 |

(Continued)

FOREIGN PATENT DOCUMENTS

| KR | 20210041803 A * | 4/2021 |
| WO | 2018/013163 A1 | 1/2018 |

(Continued)

OTHER PUBLICATIONS

European Patent Office; International Search Report and Written Opinion for PCT application No. PCT/US2022/042903, dated Dec. 14, 2022, 13 pages.

*Primary Examiner* — Trinh T Nguyen

(74) *Attorney, Agent, or Firm* — Sunstein LLP

(57) ABSTRACT

The present invention is a system and method comprising a vertical farm where the plants are nourished by an aqueous nutrient solution and where all operations of the farm: the circulation of aqueous nutrient solution, replenishment of nutrients and supplements to the solution, as well as the seeding, growing, harvesting and packaging of plants are able to be effected in an automated manner and controlled by the farm controller system. It is possible for the operations of the present invention to be non-automated, semi-automated, or fully-automated, or any combination of non-automated, semi-automated and fully-automated operations, and to be controlled either centrally or locally.

20 Claims, 28 Drawing Sheets

(56) References Cited

U.S. PATENT DOCUMENTS

| | | | |
|---|---|---|---|
| 2019/0380283 A1 | 12/2019 | Chong | |
| 2021/0137028 A1* | 5/2021 | Zelkind | B65G 1/137 |
| 2021/0212270 A1* | 7/2021 | Booker-Ogunde | A01G 31/06 |
| 2022/0087114 A1* | 3/2022 | Bertram | A01H 1/027 |

FOREIGN PATENT DOCUMENTS

| | | |
|---|---|---|
| WO | 2019/090313 A1 | 5/2019 |
| WO | 2021/055257 A1 | 3/2021 |

* cited by examiner ic solution circulation system, and the module processing system, the farm controller configured to implement lifecycle management of each set of crops.

CONTROLLER-OPERATED VERTICAL FARMING SYSTEM USING TRANSPORTABLE MODULES

PRIORITY

The present application claims the benefit of provisional applications 63/241,915, filed Sep. 8, 2021, and 63/345,283 filed May 24, 2022, each of which is incorporated herein by reference in its entirety.

TECHNICAL FIELD

The present invention relates to farming, and more particularly to farming systems, using transportable modules, wherein the systems are controller-operated.

BACKGROUND ART

Vertical farming has been used to create more efficient use of land area when growing crops. Hydroponics have been used to create fluid systems that can better transport and replenish nutrients to the crops in a vertical farming system. Fish and other creatures have been used within vertical farms to create and disperse nutrients to the plants.

Different farm plans run into problems such as determining which plants to grow when, knowing when and how to harvest the plants, and requiring manual oversight at various stages. Further, as vertical farms grow in size, the labor source required to continually monitor the water, sunlight, harvest times and other variables becomes significantly expensive. Additionally, laborers perform much of the harvesting and planting which carries significant expenses.

The embodiments disclosed herein provide for a controller-operated vertical farming system that uses transportable modules to seamlessly navigate the plants through all stages of their life cycle.

SUMMARY OF THE EMBODIMENTS

In accordance with one embodiment of the invention, a vertical farming system has a set of transportable farming modules. Each module has a set of vertically arranged farming tiers, each tier having an aqueous input and an aqueous output and configured:
  (i) to provide physical support for growth of a set of crops,
  (ii) to support circulation of an aqueous nutrient solution for the crops, and
  (iii) to provide lighting for the crops.

The vertical farming system of this embodiment further includes an aqueous nutrient solution circulation system, coupled to the aqueous input and the aqueous output of each tier and configured to cause circulation of the nutrient solution throughout the set of tiers of the module;
  a nutrient replenishment station, coupled to the aqueous nutrient solution circulation system, configured to cause replenishment of nutrients in the aqueous nutrient solution;
  a farming module processing system, configured (i) to harvest a current set of crops that has been grown in a given set of tiers of a selected module and (ii) to refill the given set of tiers with a successor set of crops;
  a module transport system, configured to cause transport of the selected module from a first location to the farming module processing system for processing and thereafter a second location; and a farm controller, coupled to the module transport system, aqueous nutri- Optionally, each farming module is self-propelled. Also optionally, the module transport system comprises a set of drive units. Each drive unit is configured to load a selected one of the farming modules and to transport the selected farming module to a destination. Also optionally, the set of drive units has fewer members than members in the set of farming modules.

Also optionally, the nutrient replenishment station includes a set of aquatic animals configured to cause the farming system to operate aquaponically. Also optionally, the farm controller is configured to initiate, automatically, transport of the selected module. Also optionally, the first location and the second location are the same.

In another aspect of the vertical farming system, the farming module processing system is configured to separate a growth medium from a set of roots of the set of crops. Optionally, the farm controller is coupled to a database that stores information regarding the lifecycle management of each of the crops in the set. Also optionally, the farm controller uses the information in the database to command the module transport system to move the selected transportable farming module in a manner consistent with the lifecycle management of the current set of crops growing in the selected module. Also optionally, the farm controller uses the information in the database to command the selected module to provide light to the current set of crops growing in the selected module in a manner consistent with the lifecycle management of the current set of crops growing in the selected module.

Optionally, each tier includes a set of cartridges, each cartridge including the current set of crops and a growth medium. Further optionally, the farming module processing system is further configured to remove a given cartridge from a given tier and to route the given cartridge to a harvesting substation selected based on the current set of crops in the cartridge.

Also optionally the vertical farming system further comprises a plurality of harvesting substations, including a given harvesting substation configured to be operated by a human. Further optionally, the harvesting substation is configured to be operated semi-manually by a human.

Optionally, the module transport system is configured to cause transport of the selected module based on a manual input. Also optionally, the farming module processing system further comprises a harvesting substation configured to remove at least a portion of the current set of crops from each tier. Also optionally, the vertical farming system further comprises a plurality of harvesting substations, including a given harvesting substation configured to be operated automatically.

BRIEF DESCRIPTION OF THE DRAWINGS

The foregoing features of embodiments will be more readily understood by reference to the following detailed description, taken with reference to the accompanying drawings, in which:

FIG. 7 is an isometric view of module 612 under circumstances when door 700 of tier 703 has been opened for access to cartridge 704.

FIG. 8 is an isometric view of module 612 under circumstances when cartridge 704 has been removed from tier 803 of module 612 by harvesting arms 801, 802.

FIG. 9 is an isometric view of module 612 under circumstances when cartridge 704 has been lowered by harvesting arms 904, 905.

FIG. 10 is a further isometric view of module 612 of FIG. 6 at the harvesting station under circumstances when harvesting wire 1003 prepares to harvest the cartridge.

FIG. 16A is a block diagram showing the components of a vertical farming system 1600 using transportable modules in accordance with an embodiment of the present invention.

FIG. 16B is a block diagram showing module 1601 of vertical farming system 1600.

FIG. 16C is a block diagram showing aqueous nutrient solution circulation system 1606 of vertical farming system 1600.

FIG. 16D is a block diagram showing processing apparatus 1607 of vertical farming system 1600.

FIG. 16E is a block diagram showing cloud 1605 and web interface 1608 of vertical farming system 1600.

DETAILED DESCRIPTION OF SPECIFIC EMBODIMENTS

Figure 1:
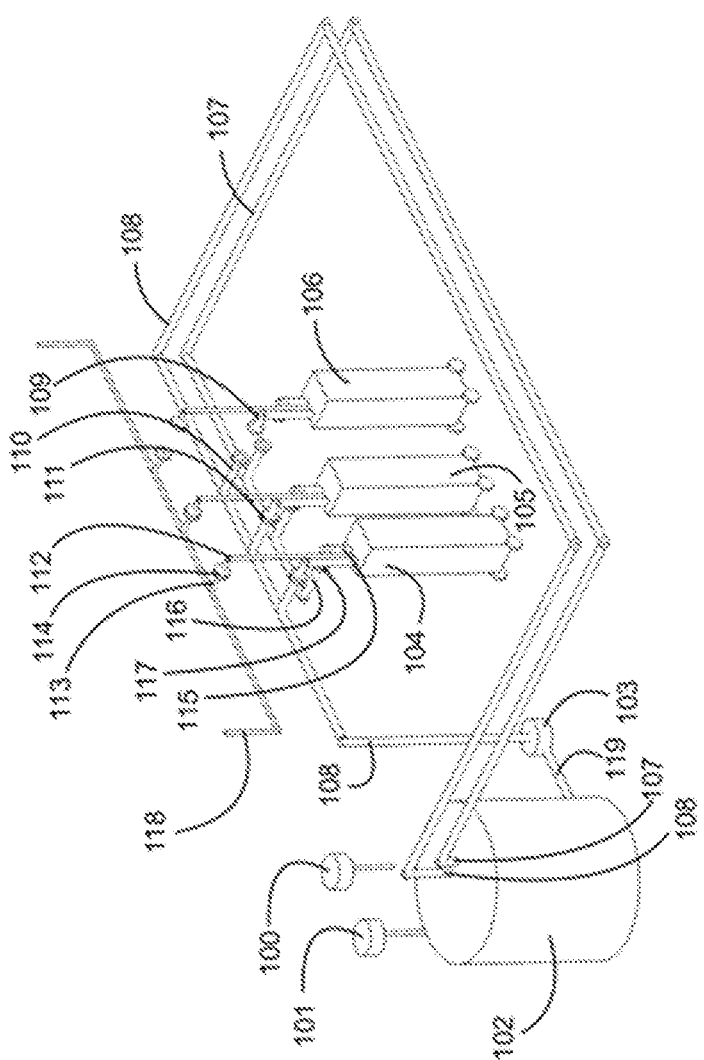
FIG. 1 is a schematic diagram of mechanical components of a vertical farming system using transportable modules in accordance with an embodiment of the present invention.

Definitions. As used in this description and the accompanying claims, the following terms shall have the meanings indicated, unless the context otherwise requires:

A "set" includes at least one member.

A "module" is a transportable stack of a plurality of plant-containing tiers.

A "tier" is a level of a module in which plants are grown. Optionally, a tier includes a set of cartridges.

A "cartridge" is an object, removably insertable into a tier, the object having a set of sides and a bottom, within which is housed a growth medium in which plants are grown.

A tier of a module is "coupled" to an aqueous nutrient solution circulation system if liquid in the aqueous nutrient solution circulation system at some point flows through the aqueous input and the aqueous output of the tier, regardless of the path taken by such liquid.

A "nutrient replenishment station" is configured to cause replenishment of nutrients in an aqueous nutrient solution.

A "harvesting substation" is configured to cause at least a part of a crop grown in a tier to be separated from a growth medium in the tier. In some instances, the harvesting substation is also configured to separate the crop into a plurality of parts (e.g. separating the leafy greens of a lettuce plant from the roots of the lettuce plant). A harvesting substation can be operated (i) automatically, by a machine, (ii) manually, by a human, and (iii) semi-manually, by a combination of a human and a machine.

A "harvesting station" includes a set of harvesting substations.

The present invention in various embodiments provides a system and method comprising a vertical farm where the plants are provided nutrients by an aqueous nutrient solution and wherein all operations of the farm—including the circulation of the aqueous nutrient solution, replenishment of nutrients and supplements to the solution, the seeding, growing, harvesting, packaging, and storage of plants—are performed in an automated manner and controlled by the farm controller. In various embodiments, the operations of the present invention are non-automated, semi-automated, or fully-automated, and any combination of non-automated, semi-automated and fully-automated operations, and to be controlled either centrally or locally.

In one embodiment, the fish produce waste from their digestive tract and gills, and the waste is converted by bacteria to nitrate, which, along with other nutrients from the fish, feed and supplements enter a distribution system to feed the plants. In one embodiment, nutrient-depleted water is then cycled back to the fish. Furthermore, in such an embodiment, the growing section, which is the section of the farm where the plants are grown, is composed of a series of vertical modules, see FIG. 2, having multiple tiers, see FIG. 3, wherein each tier, see FIG. 4, comprises a trough with a removable cartridge from which plants grow, see FIG. 5. In other embodiments, different species/creatures in place of fish provide the aquaponic environment. In various embodiments, the other species/creatures are crustaceans, mollusks or similar species/creatures available to those skilled in the art of aquaponic growing techniques. In various embodiments, hydroponics and aeroponics are used instead of aquaponics to provide nutrients to the plants. In other embodiments, the plants are grown in a drawer rather than a fully removable cartridge. In further embodiments plants are grown in a fully-static environment.

FIG. 1 is a schematic diagram of mechanical components of a vertical farming system using transportable modules in accordance with an embodiment of the present invention. FIG. 1 illustrates one embodiment of the general setup of the vertical farming system, specifically the growing area, and includes a nutrient replenishment station 102 on the left, which houses fish. (Like item numbers refer to like items throughout these drawings.) Automated fish feed 100 and supplement distribution systems 101 are above nutrient replenishment station 102, as well as a water circulatory system connected to nutrient replenishment station 102. Nutrient-rich water is sent from the nutrient replenishment station 102 through the start of the water circulatory system 119 to a pump and water conditioning stations housed in casing 103. The pump lifts the nutrient-rich water to the arterial water circulation pipe 108, which sends the water to the modules that are connected to the water circulatory system 104, 105. Herein, the water circulation system is also referred to as the "aqueous nutrient solution circulation system."

In some embodiments, modules 106 are cloud-controlled, self-propelled, and can move about the farm to connect and disconnect from the electrical system and water circulatory systems of the growing section. In some embodiments, the floor of a farm is made of a very strong material, such as concrete. The floor of the farm is required to withstand large loads from various types of machinery, including modules and water weight. Water is present in the modules, throughout the farm, and in the fish tanks.

In FIG. 1, electricity is sent to the modules through a connected power line 118 that splits off into separate electrical connection lines 113. Each module has an electrical receiving line 112 that interfaces with the electrical connection lines 113 and forms an electrical connection point 114 as they join.

Nutrient-rich water is sent to the modules through the arterial water circulation pipe 108, which splits off into separate arterial connection pipes 110 that send nutrient-rich water to the grow modules. Each grow module has an arterial receiving pipe 109 that interfaces with these arterial connection pipes and forms an arterial connection point 111 as they join, allowing nutrient-rich water to enter the top of the module. A cloud controlled valve, also referred to as the "grow station umbilical valve," is located in each arterial connection pipe of a grow station and controls the flow of water into the arterial receiving pipe of each module. A grow station is a section within the growing section of a farm where modules connect to the electrical system and water circulatory system, and modules grow their crops. In the embodiment of FIG. 1, the valve can be closed by the central control system or by a manual override in order to isolate the module from the aqueous nutrient solution circulation system, allowing the module to move without spilling any water.

In one embodiment, the electricity and water connect to the modules using a gantry system comprised of multiple gantries on top of the modules to accurately line up both sides of electrical and aqueous connection points at a grow station. In one embodiment, the gantries are connected to the arterial receiving pipe, the venous return pipe, and the electrical receiving line of the module. The gantries move left, right, forwards, backwards, upwards, and downwards to line up the arterial receiving pipe, the venous return pipe, and the electrical receiving line of the module with an arterial connection pipe, venous connection pipe, and electrical connection line of a grow station. In further embodiments, computer vision is used to accurately line up these connection points, where the vertical gantry, with a camera connected to it, is moved left, right, forwards, and backwards, and moves itself upwards and downwards depending on the location of a static image in relation to the vertical gantry's camera. In this embodiment, stepper motors are used to power the gantry system and limit switches are used to control the extension and retraction of linear movement of the gantries. In this embodiment, a static image is located at each grow station in the growing section of a farm with which the gantry's camera interacts. If the static image is to the left or right of the field of view of the gantry's camera the gantry moves accordingly to bring the static image into the center of its field of view. The gantry moves forwards towards or backwards from the static image until the size of the static image is of the appropriate size to indicate that the connection pipes are at the appropriate distance from each other to form a proper connection. To aid in this connection, magnets are used to ensure that these connections are made properly.

Once the nutrient-rich water has flowed through from the top of the module to the bottom of the module, the now nutrient-depleted water is pumped back up from the bottom tier of each module via each module's venous return pipe 115, dumping this water into the venous circulatory system's pipes 107. In one embodiment, the nutrient-depleted water is pumped to the pipes 107 by a pump. In some embodiments, the nutrient-depleted water is dumped into the venous circulatory system's pipes 107 by making a venous connection point 117 with venous connection pipes 116 that have split off from the main venous circulatory system pipe 107. Once this nutrient-depleted water has been pumped back into the venous circulatory system pipe 107 it moves through this pipe and empties back into the nutrient replenishment station 102.

In one embodiment, the electrical system and water circulatory system (including, e.g., pipes 107 and 108), of the farm, as well as sensors, machinery, and other equipment required to operate the farm may be connected physically to the building within which the farm operates. In another embodiment, the electrical system and water circulatory system, as well as sensors, machinery, and other equipment used to operate the farm are either mounted on a support structure connected to the enclosing building or freely standing within or about the enclosing building. In various embodiments, the support structure is composed of any kind of material that can provide the required support and configuration required to operate the farm. In a preferred embodiment, a system of aluminum truss scaffolding is the required support structure.

Figure 2:
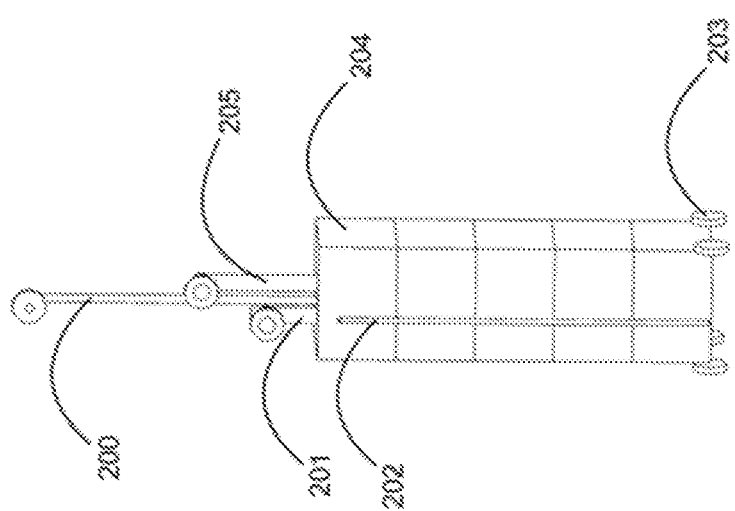
FIG. 2 is an isometric view of the farming module 104 of FIG. 1.

FIG. 2 is an isometric view of the farming module 104 of FIG. 1 and illustrates an embodiment of a self-propelled module comprising multiple tiers 204. In one embodiment the dimensions of this farming module are as follows: six feet wide, six feet deep, and eighteen feet tall. Although the module of FIG. 2 shows 5 tiers, in practice, 8 tiers is convenient, and any number is possible. In this embodiment, tiers are approximately six feet wide, six feet deep and two feet tall. Each tier comprises a water-tight trough that has a width and length almost identical to that of its tier, just slightly smaller as it needs to fit within the tier. In some embodiments the trough is approximately four inches tall, such as the embodiment shown in FIG. 3. This trough fills up with water and this water is wicked up by the growth media of the tier's cartridge, providing nutrients to the crops growing in the cartridge. In various embodiments, the trough is made out of acrylic and other materials. In one embodiment, 3D-printed, injection moulded, and extruded parts are used to provide various physical components of the troughs, tiers, and cartridges.

In one embodiment, the modules and each tier are constructed using extruded aluminum linear rail to form a metal scaffolding to provide structural integrity, and are held together using a combination of m5 screws, m5 t-nuts, 17 mm wide metal corner connectors, and various types of metal plates. This metal scaffolding is important to provide enough structural integrity to account for the weight of the water flowing through the module. Further, in this embodiment the modules are controlled wirelessly through the use of a number of Raspberry Pi computers throughout the farm. Some are on the mobile modules and some are stationary throughout the farm. The Raspberry Pis on the modules are connected via USB and are powered by a 12V to 5V converter, which is connected to the on-board 12V DC battery.

In one embodiment, the water is distributed throughout the module using three-quarter-inch and one-inch pvc pipe. In this embodiment, the PVC pipes are connected using quick-connect couplers and push-fitting pipe connectors, among others.

In one embodiment, the wheels used to move the modules are mecanum wheels, which enable the module to move forwards, backwards, left, and right without rotating. The use of mecanum wheels allows maximum density within a farm as there is not a space requirement for the modules to turn, as mecanum wheels allow for 90 degree movement. In other embodiments, any number and type of wheels can be used to allow transport of modules. In one embodiment, ball casters are used to aid in the equal distribution of weight across the base of a module. In one embodiment, the diameter of the mecanum wheels is eight inches, and each wheel tolerance is approximately 500 pounds to account for the large weight of the metal scaffolding and water within each module. In one embodiment, 12V electric motors are used to power the mecanum wheels. In one embodiment, each module has 4 mecanum wheels. In other embodiments, various amounts of wheels and other movement mechanisms are used. Further, the electric motors are powered by an on-board 12V DC battery. In this embodiment, 5V DC flow meters are used in the modules to monitor the health of water flow.

In some embodiments, the electrical system is split into 4 separate systems: 100V AC, 12V, 5V, 3.3V, where the electrical connection point 114 distributes the 110V AC, the 12V battery distributes the 12V, the 12V to 5V converter distributes the 5V, and the Raspberry PI GPIOs distribute the 3.3V. In alternative embodiments, microcontrollers other than the Raspberry Pi can be used, some of which could run entirely off 5V. In such embodiments, 5V versions of sensors and actuators could be used.

In one embodiment, the walls of the modules are made of plastic and the interiors are lined with a highly-reflective coating, such as mylar, to reduce wasted light, instead reflecting it back into the tier.

In one embodiment, there are numerous valves throughout each module, which control the flow and water level of each trough and tier within the module. The valves also control the ingress and egress of water into and out of each tier within a module and the module itself. In this embodiment, 12V DC solenoid valves are used to control the flow of water, opening some valves to direct water a certain direction while closing others.

In one embodiment, 12V DC pumps are used to pump the water back up from the bottom tier to the venous return pipe 201 via the depleted return pipe 202.

In one embodiment, there are numerous sensors in each tier, including oxygen saturation sensors, pH sensors, temperature sensors, water height sensors, growth media moisture sensors, light sensors, carbon dioxide level sensors, and bacterial sensors, among others. Most of the sensors are either 5V or 3.3V and can run off the Raspberry Pi. In other embodiments, numerous other types of sensors are useful to monitor the conditions of the growing environment. In one embodiment, each tier comprises a number of air bubblers that act to oxygenate the water, aiding in crop growth. In this embodiment, fans are present in each tier to circulate airflow. In related embodiments, when a module is connected to a grow station it connects with the farm's central power, which powers everything in the module and charges the on-board 12V DC battery simultaneously. In one embodiment, AC power from the farm's central power directly powers the LED lights and the battery converter, which charges a 12V DC battery. From this 12V DC battery everything else in the module that requires power is powered through DC power from the 12V DC battery.

The module is self-propelled using wheels 203 to move about a farm. A module has an electrical receiving line 200, an arterial receiving pipe 205, and a module return pipe 201. Nutrient-depleted water is pumped up from the bottom tier to the venous return pipe 201 via the depleted return pipe 202.

Figure 3:
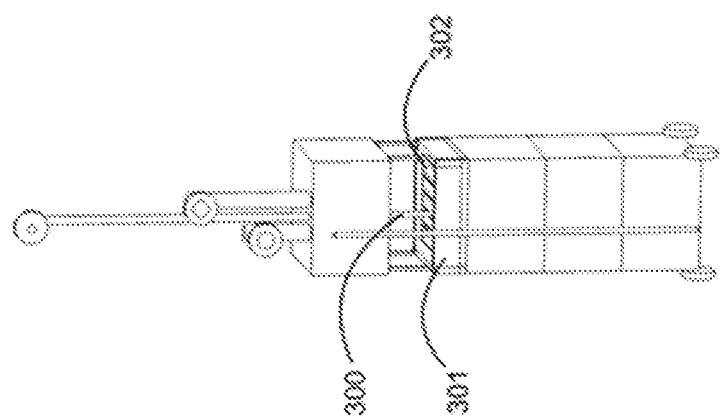
FIG. 3 is a further view of the module of FIG. 2 with a cut-away to expose, in the second tier from the top, the grow trough 301, the cartridge 302, and the ingress pipe 300.

FIG. 3 is a further view of the module of FIG. 2 with a cut-away to expose, in the second tier from the top, the grow trough 301, the cartridge 302, and the ingress pipe 300. The water-tight grow trough 301 has a door that opens for harvesting to allow access to the cartridge 302, which houses the plants as they grow. The door opens in any number of ways, including, but not limited to, a normal hinged door, by sliding up and down, and like a drawbridge. Water ingress pipe 300 allows nutrient-rich water to flow into each tier from above. Other similar components are located within each tier but are not visible in this Figure. In other embodiments, instead of doors that open to allow access to the cartridge, the trough comprises an elevating platform that lifts the cartridge out of the trough and then lowers it again. In a derivative embodiment, shown in FIGS. 23A and 23B, instead of a door there is a ramp 2300, which allows the cartridge to slide up, out of, and back into the tier during harvesting and other stages without a door.

In another embodiment, cartridge 302 has wheels connected to its sides, which allow cartridge 302 to roll up angled ramps on the inside walls of a tier. In different embodiments, the cartridge 302 is moved into a tier by an electromagnet, which connects to the front of the cartridge and arms from the harvester connecting to an attachment point on the cartridge, such as metal hooks. Both of these methods allow the cartridge to be completely removed from a tier on wheels.

In another embodiment, the cartridge 302 is lifted out of its tier through the use of a forklift-equipped machine. In this embodiment, a pair of arms of the machine are configured to assume a lifting position beneath corresponding rigid flanges on the outside of the cartridge 302 to support lifting of the cartridge. Once the arms have made contact with the rigid flanges of the cartridge, the forklift-equipped machine lifts the cartridge straight up, approximately 3 inches, and then retracts its arms out of the tier, bringing the cartridge with it. The cartridge 302 is then placed upon a conveyor, or similar transportation machine, and is sent to be harvested at the appropriate harvesting substation, depending on the crop that has been grown in it.

Figure 4:
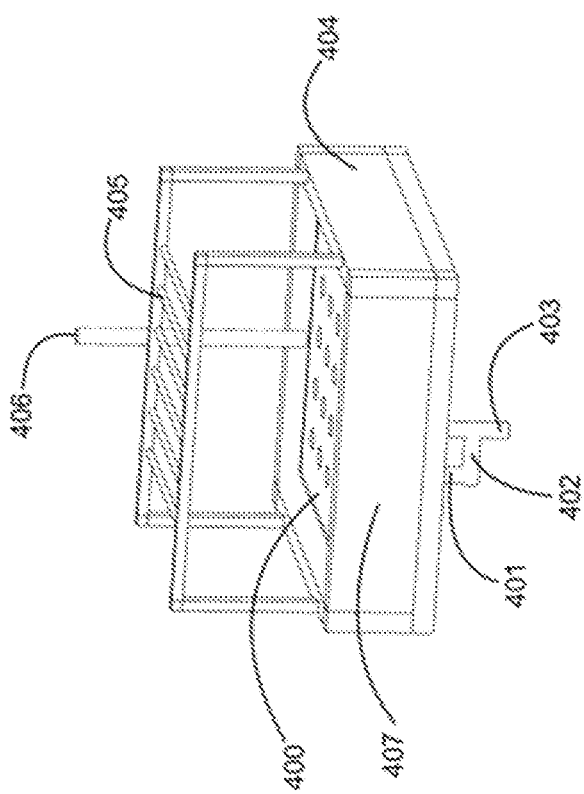
FIG. 4 is an isometric view of the tier of FIG. 3.

FIG. 4 is an isometric view of the tier of FIG. 3. FIG. 4 illustrates one embodiment of a tier, including LED lights 405, water ingress 406, and water exit pipes 401, 403, which are connected by connecting pipe 402. The grow trough of tier 404 has a water tight door 407 that opens and closes during harvesting to allow access to the cartridge 400 that houses the plants as they grow. Other components are located within the tier but are not visible in this Figure.

In one embodiment the LED lights are connected to a gantry, allowing the lights to move up and down within a tier. The vertical movement of the LED lights via the gantry enables positioning them at the desired height above the crop being grown. As the crop grows taller the LED lights move up accordingly, allowing for optimal growing conditions. In one embodiment, a set of sensors, for example in a camera, is used to determine a convenient height of the LED light gantry.

In one embodiment, tiers are connected via piping and water circulates from one tier to the next. At each tier in such embodiment, airstones oxygenate the water and then the water enters a trough, roughly 4 inches deep, where the plants are grown inside of the cartridge, see FIG. 5. An airstone is a porous object through which air is pumped and from which air bubbles are emitted that provide oxygen to the water throughout all areas of the farm where there is water. The air is vital for all biological processes in the farm, including, but not limited to, the fish, bacteria, and plants. In an alternate embodiment, the tiers are flooded and drained periodically exposing the roots of the plants directly to air, reducing, or even eliminating, the need for airstones at each tier. In various embodiments, airstones are placed throughout the entire aqueous nutrient solution circulation system. Placing airstones near the fish and plants ensures that the water remains oxygenated where the oxygen is needed most.

In one embodiment, an archimedean screw, auger or similar objects are used to distribute the fish feed from a fish feed hopper to the fish.

In the embodiment of FIG. 4, water leaves the trough via both the normal overflow hole and the drain hole to flow down to the next tier. The normal overflow hole is higher than the drain hole. The drain hole is normally shut with an electronically controlled valve and is used to empty the trough entirely. The piping attached to each exit point 401, 403 rejoins below the trough 402 and then connects to the aeration system for the next tier down, which then in turn connects to that next tier's trough, etc. thereby creating a controlled cascade of nutrient-rich water from the top of the module down to the bottom. In one embodiment, the cascade is monitored by water flow sensors in each tier and signals from such water flow sensors are used by the central control system to open and close valves to adjust the flow as needed.

In one embodiment, once the water exits the lowest tier, its piping connects to a pump, or series of pumps, which pumps the water up to the venous return pipe 115, via the depleted return pipe, 202 at the top of the module. In such an embodiment, water flow sensors exist to monitor the flow. Once the water has reached the venous return pipe 115 it continues through the venous connection point 117 and into a venous connection pipe 116, from which the nutrient-depleted water enters the venous circulatory system 107 on its way back to the nutrient replenishment station.

In one embodiment, the nutrient replenishment station is a tank that houses the fish of the aquaponic system, from which nutrient-rich water is sent to the modules and to which nutrient-depleted water is returned. In such an embodiment, the venous circulatory system is a network of pipes that receive nutrient-depleted water from modules and returns the water back into the nutrient replenishment station.

In one embodiment, each tier has high efficiency LED lights 405, which allow the plants to photosynthesize and thereby grow. The lights emit light across spectra suited for the types of plants that are being grown. In some embodiments, the peak wavelengths of light emitted are varied based on the crop in the tier. In some embodiments, the lights are strobed in a way that works with the natural process of photosynthesis to save energy when the plants are not able to absorb more light. In some embodiments, the lights emit ultraviolet (UV) and/or infrared (IR) light. Furthermore, one could also implement a setup where instead of LEDs the plants are grown using natural sunlight. In other embodiments, a combination of lighting sources are used, including, but not limited to, LED lights, UV lights, IR lights, and natural sunlight. In some embodiments, walls of the tiers are coated with highly reflective material, e.g. mylar, to reduce wasted light, instead reflecting it back into the tier.

In one embodiment, there are numerous modules wherein nutrient-rich water circulates from the fish tanks to the modules in a series of pipes along the ceiling that act like the arteries of a circulatory system. In other embodiments, the nutrient-rich water circulates from other various embodiments of nutrient replenishment station 102 to the modules. Once the water is depleted it is pumped up from the bottom of the module into a second series of pipes along the ceiling that act like the veins of the circulatory system 107, returning the nutrient-depleted water back to the fish tanks. In other embodiments, the circulatory system 107 does not have to be entirely in the ceiling. Parts or all of it could be at different heights, or even embedded into the floor of the farm. In some embodiments, including aeroponic embodiments, an arterial supply system is provided without a venous return system.

In some embodiments, the modules are able to disconnect themselves from the ceiling's circulation pipes and move. In one such embodiment each module has wheels, and thus is able to propel itself using battery power. In related embodiments, the module may have movement devices besides wheels such as ball casters or other devices known to one having ordinary skill in the art. In one embodiment, the modules are able to navigate accurately through the use of Ultra Wideband radio positioning systems that enable modules to accurately position themselves within the farm space and accurately interface with all parts of the farm. In other embodiments, technology similar to Ultra Wideband radio is used. In other embodiments, the modules use line-following technology, Lidar, AR or other spatial tracking technologies to accurately navigate a farm. One skilled in the art would be able to implement such technologies.

In other embodiments, the modules use a set of drive units, shared between the modules, which connect and disconnect from each module to transport the modules around the farm. In various embodiments, the drive units move on a rail, track, guide, conveyor or other similar system, either below, above, or beside the modules. In other embodiments, the cartridges themselves are transported throughout a farm independently, without modules, by similar means of transportation as described above. In other embodiments, different types of the cartridges grow and transport the plants, such as vertical columns from which plants grow outwards. These vertical columns move independently throughout a farm in similar methods as detailed above.

In other embodiments, the cartridges are housed within a flexible 3D grid, where the cartridges can move throughout the grid as they grow, with the grid using a system of conveyors to move the cartridges throughout the grid. To enable access to all parts of the grid, for the purposes of maintenance to the grid and to have general access to all parts of the grid, the sections of the grid move independently from one another, enabling physical access to any part of the grid. These sections would only move to allow access to all parts of the 3D grid, not to transport the cartridges themselves. A system of conveyors along with pulleys, lifts, elevators, rails, tracks, and other modes of transportation would be used to effectively move the cartridges around the grid and the grid itself, allowing access to all parts of the grid. Water flows through the grid, providing the nutrients for the plants, and drains into pumps, which then pumps the nutrient-depleted water back to the nutrient replenishment station. In these embodiments, any of the harvesters described herein could be used to automatically harvest the crops, as well as to perform the entire post-harvesting and seeding process. In one embodiment, servos, rack and pinion technology, linear actuators, conveyors and other movement devices are used to perform certain operations, including but not limited to the harvesting.

Figure 5:
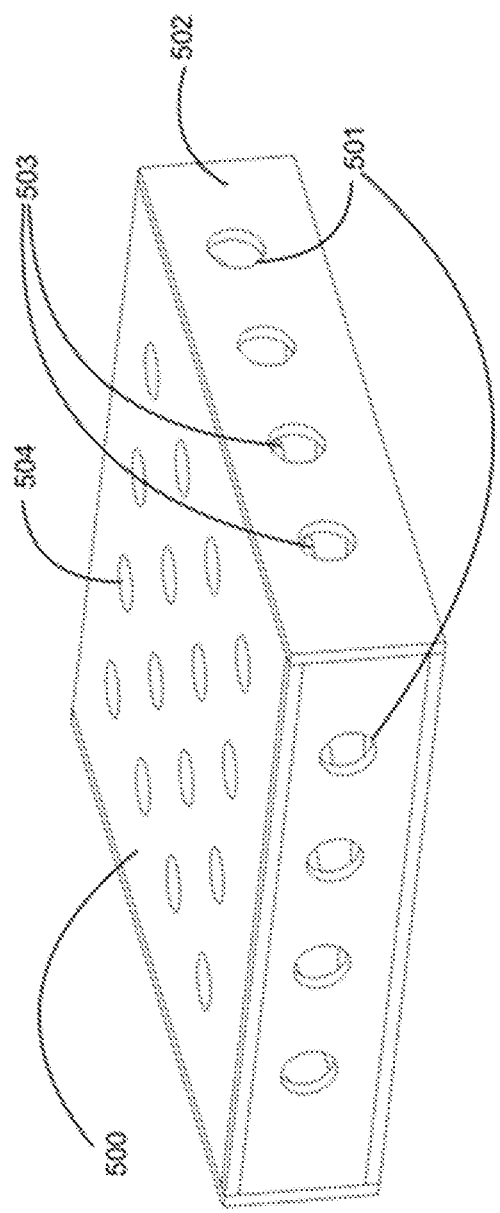
FIG. 5 is an isometric view of the cartridge 400 of FIG. 4.

FIG. 5 is an isometric view of the cartridge 400 of FIG. 4. FIG. 5 illustrates an embodiment of cartridge 502 having a top plate 500. There are perforated holes on all four sides 501 and the bottom of the cartridge 503 to allow water to flow in and out. Cartridge 502 contains a lining that stops any of the growth media from exiting the cartridge and dirtying the water, but itself is water permeable to allow the nutrient-rich water to wick up into the cartridge. Top plate 500 on top of the cartridge has holes perforated at specific distances from each other, these holes are the growth sites 504 within which seeds are planted and plants grow from. The holes are spaced according to the appropriate distance required for each individual plant's growth requirements.

Figure 6:
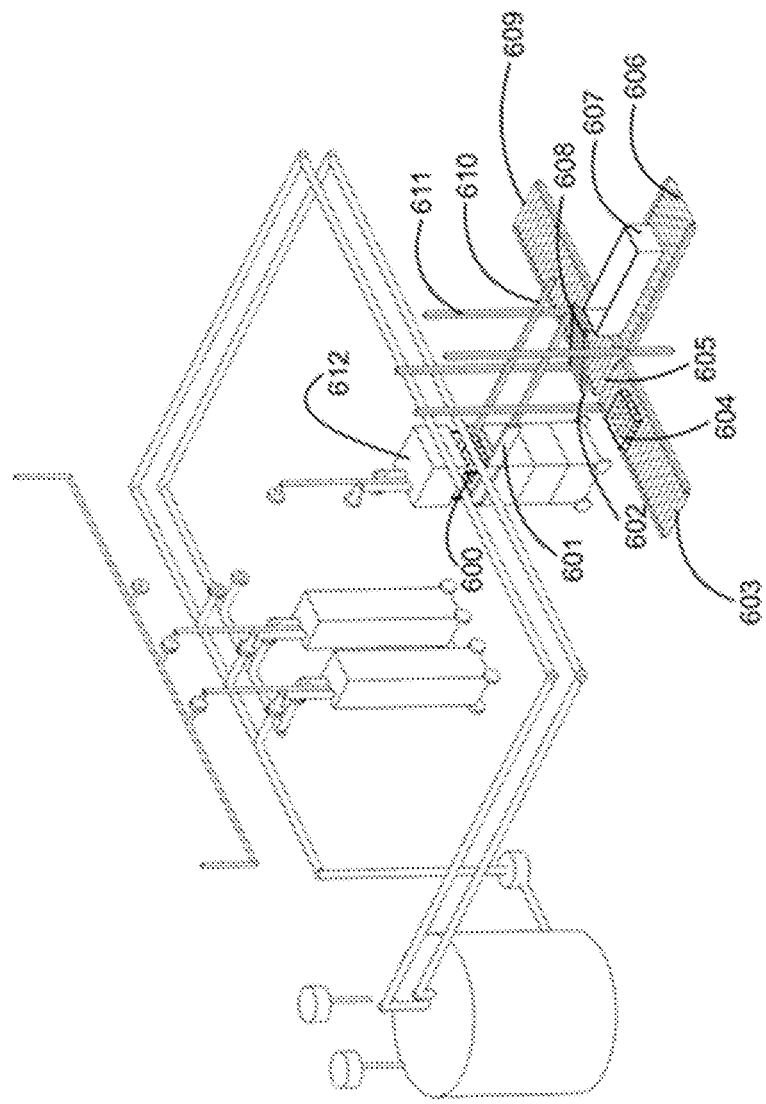
FIG. 6 is a schematic diagram of mechanical components of a vertical farming system using transportable modules, with module 612 at the harvesting station, in accordance with an embodiment of the present invention.

FIG. 6 is a schematic diagram of mechanical components of a vertical farming system using transportable modules, with module 612 at the harvesting station, in accordance with an embodiment of the present invention, further including the harvesting station of the processing apparatus. Module 612 is shown being harvested; the module has drained and has disconnected from the electrical system and water circulatory system of the farm, and has driven over to the harvesting station. The water-tight door 601 of the second-highest tier of the module has opened, allowing the harvesting arms of the harvesting station 610 to reach into the tier and pick up the cartridge 600 to remove it from the tier for harvesting of its plants. In one embodiment, electromagnets are present on the ends of the harvesting arms 610, which connect to the cartridge 600 pulling them out of the tiers for harvesting. These electromagnets can be on hinges, allowing them to pivot and have a flush connection with the cartridge. The vertical harvesting beams of the harvesting station 611 move the harvesting arms 610 up and down within the harvesting station.

In one embodiment the tiers of the modules do not have doors that swing open, allowing access to the cartridges, but instead use a retractable door or blind that retracts upwards. The door opening allows the harvesting arms of the harvesting substation to access the cartridge. In other embodiments, the retractable door or blind can retract left, right, down or inside the tier. In some embodiments the cartridge has flanges at the top that protrude outwards from its sides. The harvesting arms of the harvesting substation reach into a tier and are positioned to reach under the flanges allowing the cartridge to be lifted. The harvesting arms lift the cartridge up and out of the tier to be harvested. Newly-seeded cartridges are lifted, in the same manner using the flanges, up and into empty tiers by the harvesting arms.

In some embodiments, limit switches are used throughout a farm to indicate the range that certain apparatuses should extend and retract, including but not limited to the harvesting arms, vertical harvesting beams, gantries, and other linear motion devices throughout the farm.

In the embodiment of FIG. 6, there are four conveyor belts in the harvesting station. The conveyor 603 on the left moves seeded cartridges from the seeding area to be inserted back into an empty tier once its cartridge has been removed and its plants are harvested. Conveyor 605 moves the harvested cartridge to the right onto conveyor 609, which moves the harvested cartridge to post-harvest processing. Conveyor 608 transports the harvested plants into the produce storage container 607. Conveyor 606 moves the produce storage container 607, which receives the harvested plants as the cartridge is harvested. Conveyor 606 transports the produce storage container 607 into the cooler for storage until the produce is ready to be picked up for distribution. The produce storage container 607 stores the produce from harvest until they are delivered to their final customer. This storage container is returned to the farm and reused after it has been cleaned.

Once each tier has had its cartridge removed and harvested and a new seeded cartridge has been put into the tier emptied though harvesting, the vertical harvesting beams 611 of the harvesting station move the harvesting arms of the harvesting station 610 to the next tier to harvest its cartridge. Then, a new seeded cartridge is installed in its place in the tier. This process continues until all cartridges of the module 612 have been harvested and a new seeded cartridge has been put into each tier of the module. Once all tiers have been processed and new seeded cartridges have been installed in each tier of the module 612, the module returns to the growing section of the farm and connects back to the electrical system and water circulatory system, allowing it to start growing a new crop of plants in each of its tiers. In some embodiments, crops having different harvesting schedules are grown in the same module on different tiers. The central control system knows which tiers should be harvested, based on each tier's harvesting schedule and generates commands for the harvesting station to harvest or skip tiers dependent on their schedule.

In one embodiment, the farm is divided into two main sections, a growing section (implemented by the tiers of each module of a set of modules) and a processing section (implemented by the farming module processing system). In one embodiment, the processing section is an area in a farm where everything besides the growing of produce takes place, including, but not limited to, seeding, harvesting, and post-harvest processing of cartridges. In one embodiment, the post-harvest processing refers to all of the operations involved from the point a module interfaces with the processing section until it is refilled with seeded cartridges and begins its return to the growing section. The modules stand in the growing section, attached to the water circulation system and the electricity system and grow their plants. When the plants have reached a set maturity, as determined by the central control system according to various factors including, but not limited to, the length of time they have been growing and cameras built into each tier that monitor the plant growth algorithmically, the module drains itself by disabling the water ingress from the arterial water system into its top tier and opening all the drain valves so that all of its tiers empty. The water drains into the bottom tier of the module, from there it is pumped back up to the top of the module through the depleted return pipe, and empties back into the venous circulatory system, and returns back to the fish in the nutrient replenishment station. Once empty, the module physically detaches itself from the water circulation system and the electrical system and moves to the processing section.

In one embodiment, there are a number of stations that condition the water once it has left the nutrient replenishment station on its way to the growing section via the arterial circulatory system, shown in FIG. 1, housed in casing 103. In one embodiment, the arterial circulatory system is a network of pipes that send nutrient-rich water from the nutrient replenishment station to the modules. One of the stations is a mechanical filtering station, where water passes through a form of porous medium, for example foam, to separate the solids from the fish waste. This porous medium is cleaned out using high pressure water, with pipes perpendicular to the distribution flow. Valves shut the distribution line off ensuring the dirty water exits through a drain rather than into the arterial circulatory system. In one embodiment, a conditioning station acts to add beneficial bacteria to the water. The conditioning station takes the ammonia in the water, produced by the fish, and converts it to nitrate on its way to the growing section. This conditioning station houses a number of high surface area objects, such as plastic balls or gravel on the surface of which bacteria live on. In a derivative embodiment, another conditioning station is provided where mycorrhizae live and grow and can enter into the arterial circulatory system to attach to the roots of growing plants to help boost their growth. This can be a deep water raft holding plants that grow mycorrhizae on their roots. Once the nutrient-depleted water returns via the venous circulatory system towards the nutrient replenishment station there is a UV filter added inline to the venous circulatory system pipe 107 that removes any pathogens or algae.

Figure 7:
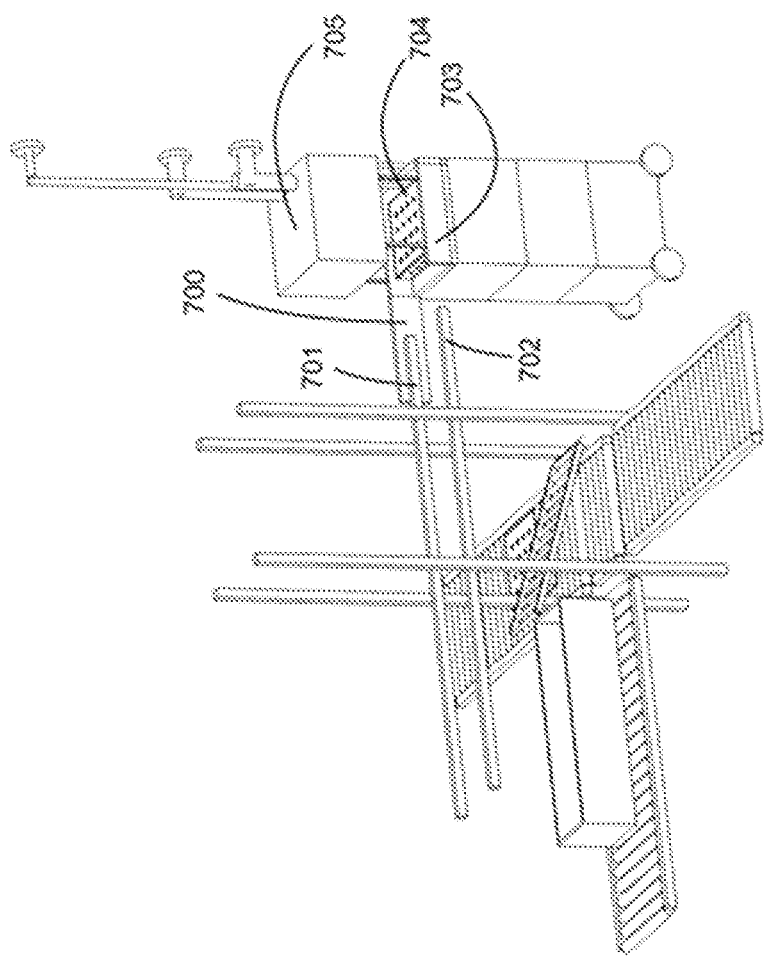
FIGS. 7-10 are successive views of module 612 of FIG. 6 at a harvesting station.

FIG. 7 is an isometric view of module 612 of FIG. 6 at the harvesting station. FIG. 7 illustrates an embodiment in which module 705 interfaces with the harvesting station. The water-tight door 700 of tier 703 has been opened and the harvesting station is about to extend its harvesting arms 701, 702 into the tier 703 and bring the cartridge 704 out of the module 705 to be harvested. In one embodiment, water-tight door 700 uses a rubber hinge and rubber sides that open and close like a Japanese fan to aid in waterproofing. Other embodiments are also possible to someone skilled in the art.

The harvesting station itself can have multiple harvesting substations that vary in how they operate, and cartridge 704 is routed to different substations depending on the crop type that has been grown in it. In one embodiment, if cartridge 704 contains a crop of lettuce or similar leafy green, it is routed to a substation that has a specific harvesting mechanism for harvesting leafy greens, such as a rotating cutting device. At this substation the rotating cutting device rotates in one plane, and the cartridge is pushed through the device, allowing the top, or marketable portion of the lettuce or leafy green, to be separated from its roots. This cutting device removes all of the tops of the plants from the cartridge, routing them to a further processing substation, where they are prepared for packaging and storage in an environmentally controlled storage room before they are picked up or delivered to their final customer. Other harvesting substations exist to harvest different types of crops. In another embodiment, various harvesting stations, for various produce, include a robotic collection system. In one embodiment a strawberry harvesting substation has a robotic hand. In some embodiments for harvesting root vegetables, a root vegetable harvester is used. At a root vegetable harvesting substation the leafy portion of the potato plants, such as the edible leafy greens of sweet potatoes, are removed from the top of the cartridge using a cutting device, and are either disposed of, composted, or routed for packaging and storage. Once the leafy portion of the root vegetables have been removed from the cartridge, the root vegetables that have grown inside the cartridge amongst the growth medium are routed within the cartridge for further processing. During this further processing the root vegetables and the growth medium are removed from the cartridge, and the root vegetables are then separated from the growth medium, cleaned, and routed for packaging and storage, before being picked up or delivered to their final customer. In other embodiments, harvesting substations have humans providing the harvesting of cartridges in a manual or semi-manual manner. In some embodiments, using humans for harvesting is done when the crops' dedicated automated harvester is broken or otherwise not functioning properly. There can be any number of different automated substations and different automated harvesting mechanisms and processes, and there can also be a manual harvesting substation. In some embodiments, the cartridges are routed to the humans at the manual harvesting station, so that the station can be operated ergonomically. For example, the height and environment conditions could allow humans to harvest the crops efficiently and safely.

Figure 8:
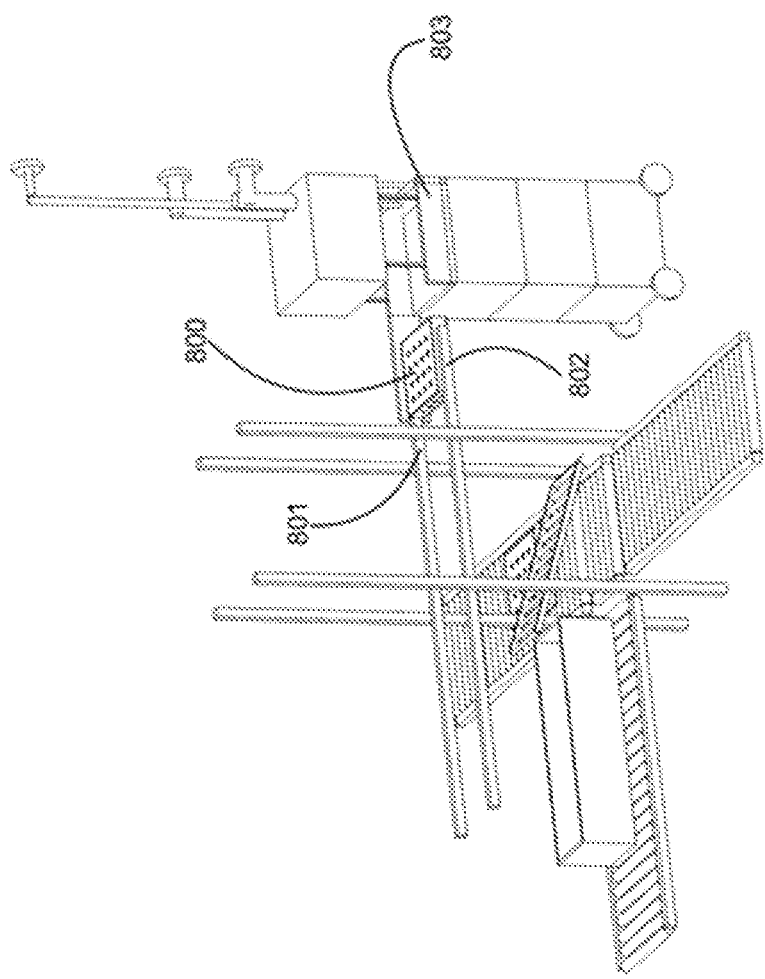

FIG. 8 is an isometric view of module 612 of FIG. 6 at the harvesting station. FIG. 8 illustrates an embodiment in which cartridge 800 has been removed from tier 803 from a module by the harvesting station. The harvesting arms of the harvesting station 801, 802 have picked up the cartridge 800 and removed it from its tier.

Figure 9:
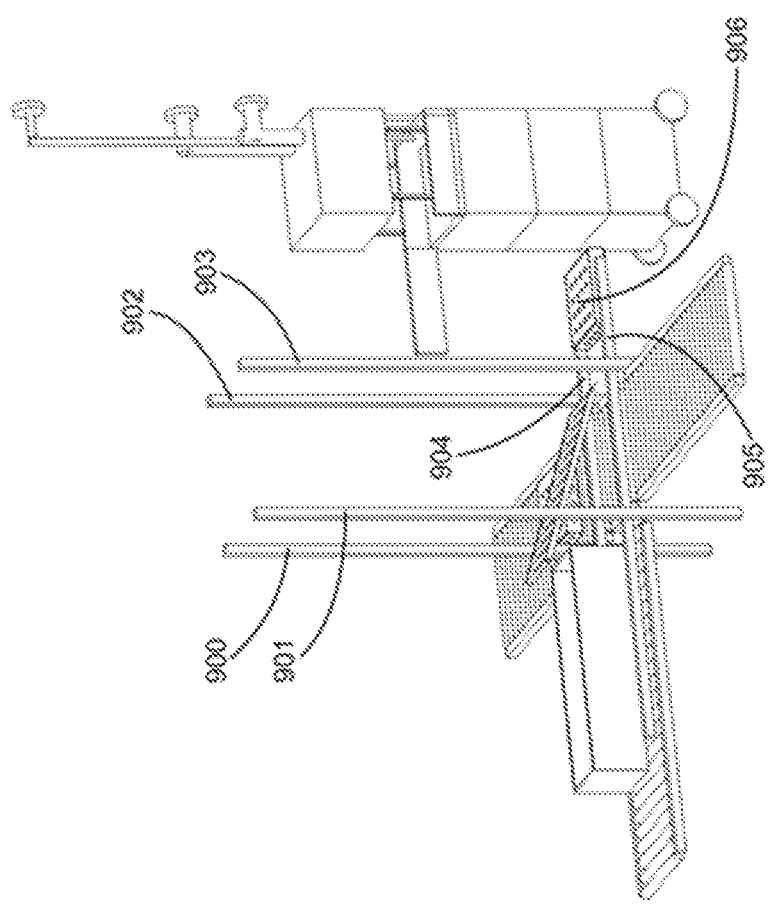

FIG. 9 is an isometric view of module 612 of FIG. 6 at the harvesting station. FIG. 9 illustrates an embodiment of cartridge 906 at its lowest point, being held by the harvesting arms of the harvesting station 904, 905 which have been lowered by the vertical harvesting beams of the harvesting station, 900, 901, 902, and 903.

Figure 10:
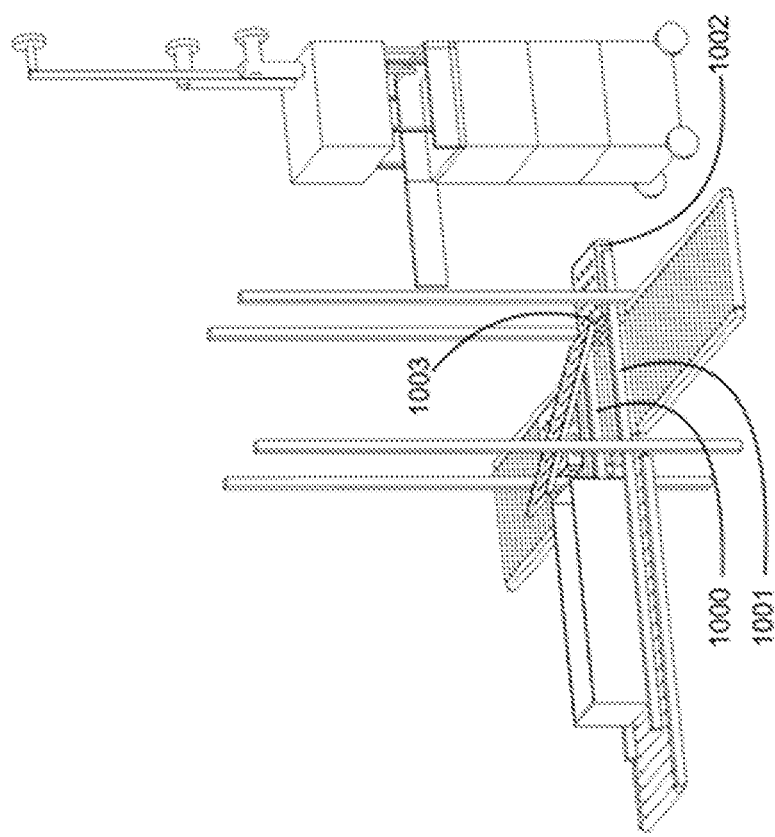

FIG. 10 is an isometric view of module 612 of FIG. 6 at the harvesting station. FIG. 10 illustrates an embodiment of cartridge 1002 being pulled by the harvesting arms of the harvesting station 1000, 1001 towards the harvesting wire 1003 that will cut through the base of the plants and separate the tops of the plants from their roots. In one embodiment, the wire is diamond wire, which is wire coated with fine diamond particles allowing for the separation of the tops of crops from their roots through cutting. In other embodiments, fishing wire and similar wires are used to produce the same separation.

Figure 11:
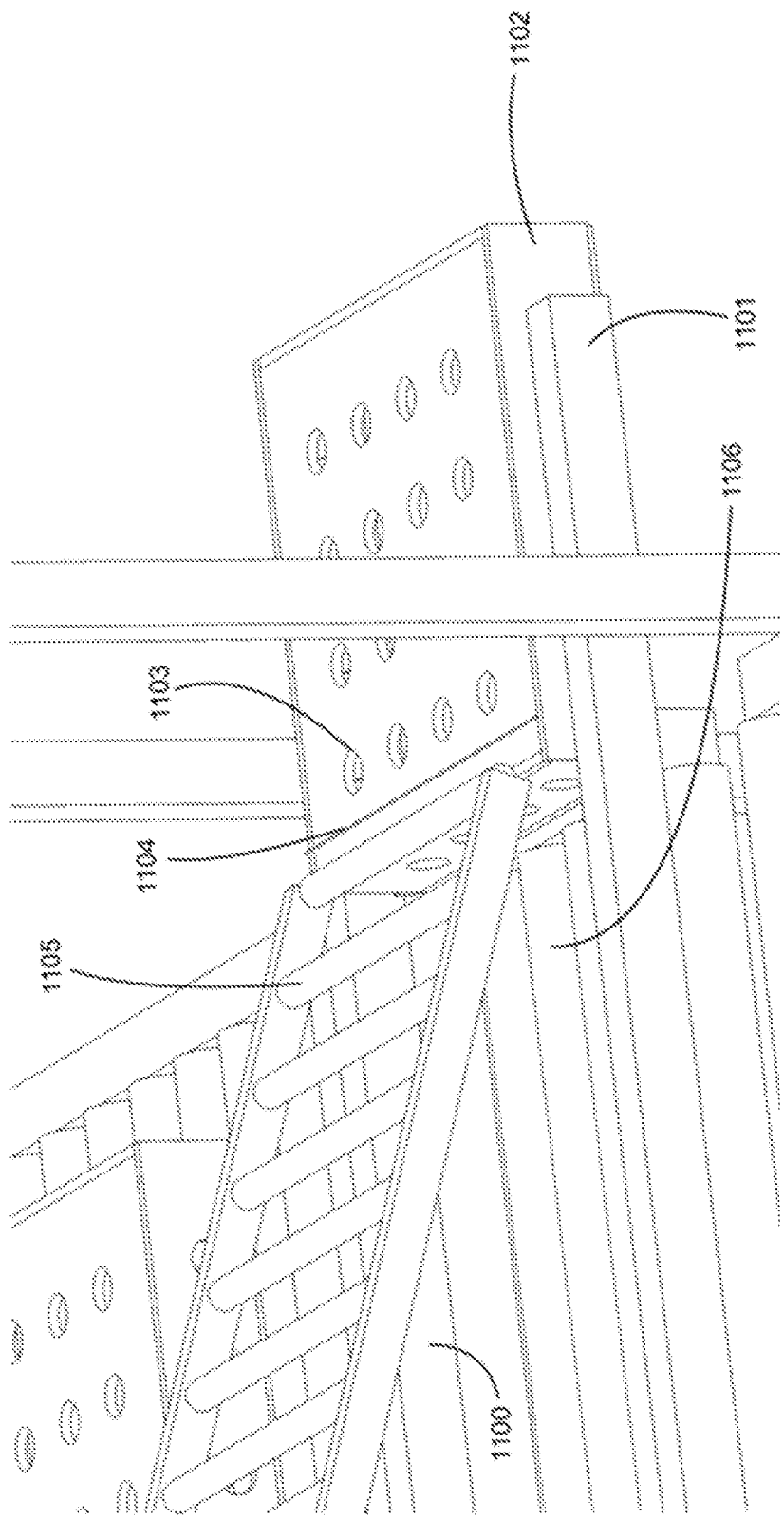
FIG. 11 is a zoomed-in isometric view of cartridge 1002 of FIG. 10 at the harvesting station.

FIG. 11 is a zoomed-in isometric view of cartridge 1002 of FIG. 10 at the harvesting station. The harvesting arms 1100, 1101 of the harvesting station moving the cartridge 1102 towards the rotating harvesting wire 1104. The tops of the plants that are growing out of the grow sites will be separated from their roots, the tops of the plants will fall onto the conveyor belt 1105, which will then transport the tops of the plants towards the produce storage container. As the cartridge 1102 is pulled inwards it eventually rests upon a conveyor belt 1106 that transports it onto another conveyor belt, which sends it off for post-harvest processing.

Figure 12:
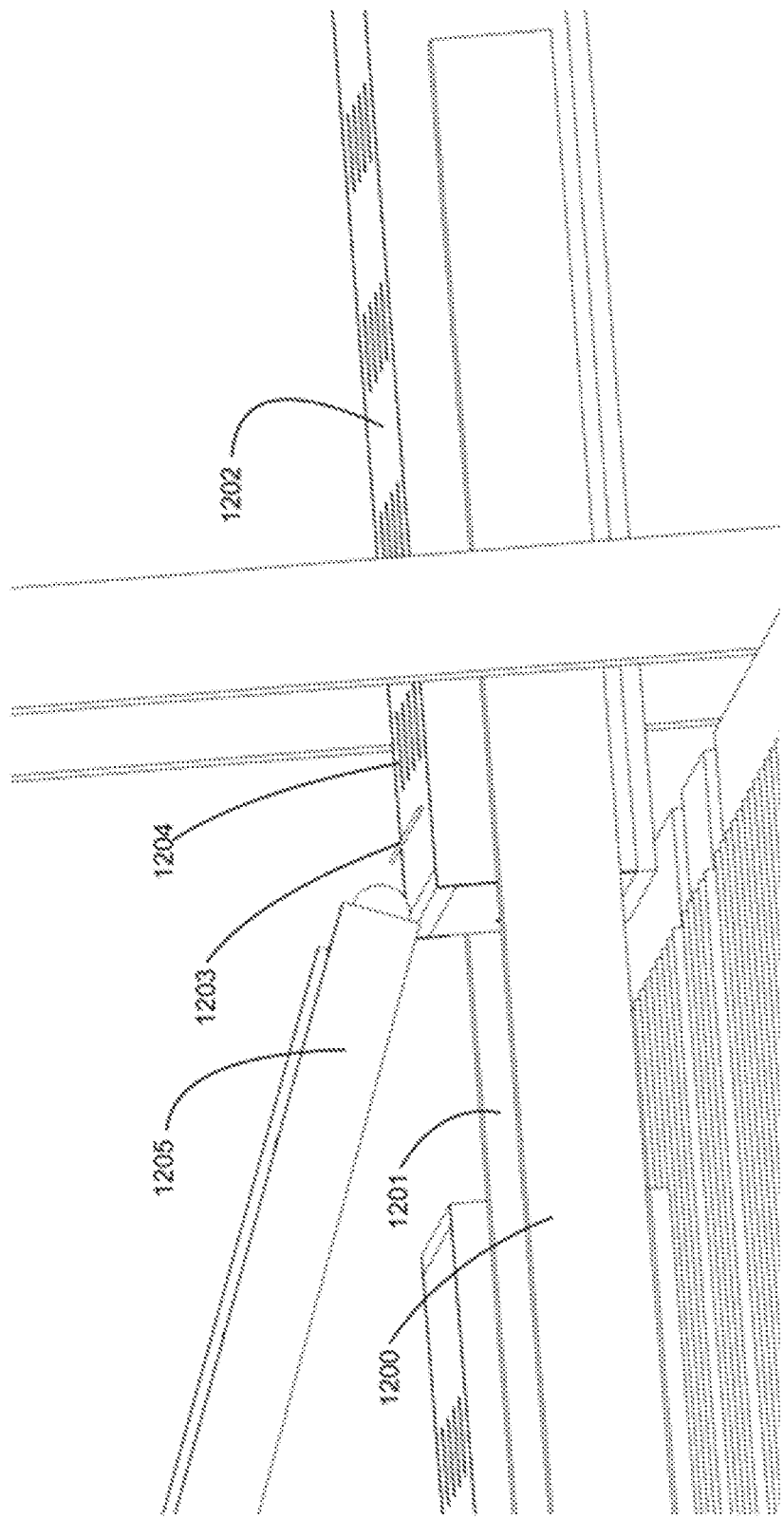
FIG. 12 is a further isometric view of the cartridge 1102 of FIG. 11 at the harvesting station.

FIG. 12 is a further isometric view of the cartridge 1102 of FIG. 11 at the harvesting station. FIG. 12 illustrates an embodiment in which the harvesting interface between the cartridges 1202 that have the plants growing in its growth sites 1204 and the harvesting wire, 1203, which separates the tops of the plants from their roots, and is shown in more detail from a different angle. Once separated from their roots the tops of the plants then fall onto the conveyor belt 1205 which transports them to the produce storage container. The harvesting arms of the harvesting station 1200 & 1201 bring the cartridge 1202 towards the harvesting wire 1203. In other embodiments, the cartridge is moved along a conveyor belt angled downwards so the plants are aided in their fall onto conveyor belt 1205 by gravity.

Figure 13:
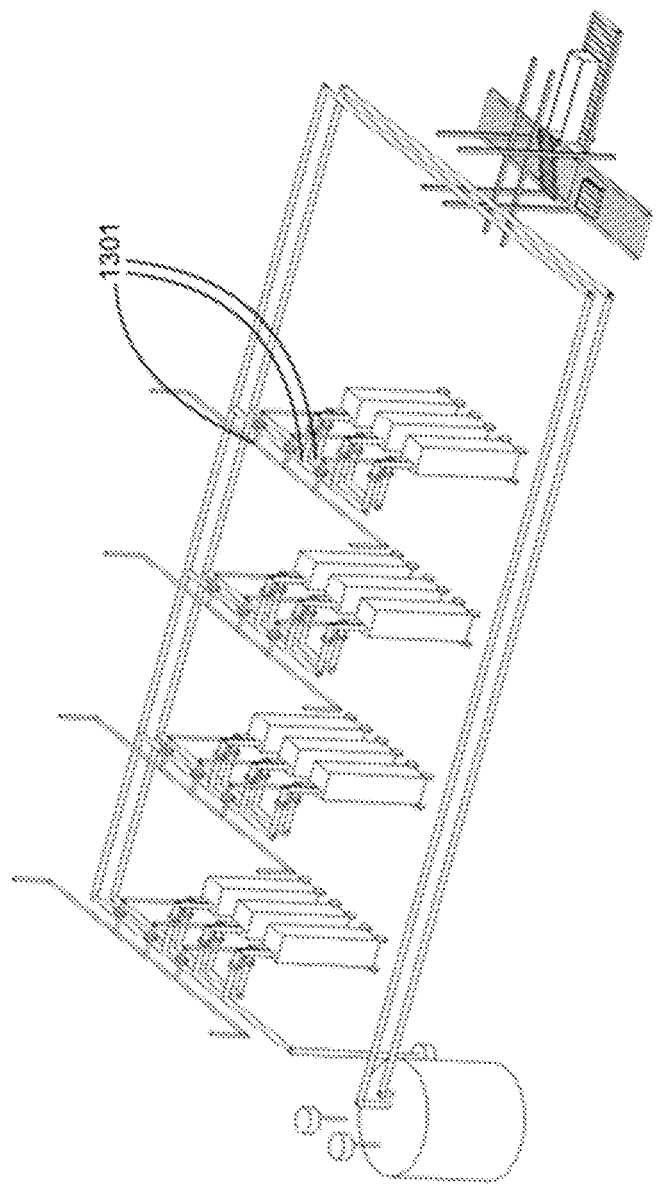
FIG. 13 is a schematic diagram of mechanical components of a vertical farming system using transportable modules in accordance with an embodiment of the present invention.

FIG. 13 is a schematic diagram of mechanical components of a vertical farming system using transportable modules in accordance with an embodiment of the present invention. FIG. 13 illustrates an embodiment in which the farm comprises multiple stacks of modules, each of which are connected to the electrical system and the water circulatory systems. Each module can disconnect from these systems and drive itself over to the harvesting station. Once the module has had all of its cartridges harvested and new seeded cartridges have been put into each tier of the module, the module drives itself back and reconnects to a grow station 1301 where the module connects back to the electrical system and the water circulatory systems, allowing a new crop of plants to begin growth.

In one embodiment, modules are arranged by a farm controller, (also referred to as the central control system and farm controller system), which is a cloud controlled software system that operates all operations in a farm, such that moving modules from the growing section to the processing section is streamlined. In such an embodiment, the growing section can be arranged as a grid with connection points to the water circulation system and the electrical system placed at each grow station 1301. In this embodiment, the modules line up along one of the axes of this grid sorted according to which modules will be harvested soonest. Each time one needs to be processed, the module leaves the front of its stack to go to the processing section and all the modules lined up behind it go through a process by which they can drain and disconnect themselves from the water and electricity, advance forward by one grow station, and then reconnect and continue their normal growing process. Once the module is processed in the processing section, it returns to the back of the grid and reconnects itself to the water circulation system and electrical system at an available grow station, which might be the grow station at the end of the stack it was in before, that point having opened up when the other members of that stack advanced forward.

In one embodiment, once a module reaches the processing section it can interact with the processing apparatus, see FIG. 6. In one embodiment, the processing apparatus encompasses all machines and other apparatuses that are involved in the processing of produce and equipment involved in the seeding, harvesting, and storage of harvested produce as well as all equipment involved in these processes. The processing apparatus harvests the grown plants by removing a cartridge that has plants ready for harvesting, and then replants a new set of seeds of the kind determined by the farm's central control system. The new set of seeds is planted into an empty cartridge and the newly seeded cartridge is put into the now empty tier. The processing of a module proceeds vertically from tier to tier. Each tier in turn has its cartridge removed, processed, and then has a newly seeded cartridge returned to it. In one embodiment, this is done one tier at a time, from top to bottom. Once this is done for every tier of the module, the module returns back to the growing section as described above. In alternate embodiments, which do not employ a cartridge, the harvesting apparatus can reach inside the tier in order to remove the plants. In another embodiment, which does not use a cartridge, the harvesting apparatus pulls out a drawer containing the plants that are ready to be harvested.

In one embodiment, the trough in each tier of a module contains a removable cartridge that fills up almost the entire length and width of the trough. In such an embodiment, the cartridge is made of aluminum and its bottom and sides are perforated like a colander so that water can flow through them. In this embodiment the top of the cartridge is covered by another metal sheet 500 whose holes exist so that plants can grow out of them. These holes can be spaced specifically for each kind of plant that might be grown, for example, for butterhead lettuce the holes might be 2 inch diameter holes with their centers spaced 6 inches apart, whereas for garlic they might be 2 inch diameter holes with their centers spaced 3 inches apart. In some embodiments, the top plate 500 can be left out, for example, to grow microgreens. The interior of the cartridge is lined with a porous lining, and then filled with a growth medium. In a preferred embodiment, the growth medium is coconut coir and the porous lining is cheesecloth. Coconut coir is an inert material derived from the husks of coconuts that serves as the growth media from which plants grow. When the trough is filled with water the lining ensures that the nutrient-rich water can reach the coir to bring it nutrients which are wicked up to the plants, but that the coir cannot escape to dirty the water or clog any valves. In other embodiments, the cartridge could be lined with a water permeable material other than cheesecloth, for example, a porous plastic cloth, and could use a different growth medium other than coconut coir such as foam, a plastic cloth, rockwool, gravel, soil, clay rocks, or similar materials.

In one embodiment, the cartridge is removed by the harvesting arms of the harvesting station of the processing apparatus during processing, see FIG. 7-FIG. 12. In one embodiment, the harvesting arms are horizontal beams that move up and down via their connection with the vertical harvesting beams and move inwards and outwards to reach into tiers to remove harvestable cartridges for harvesting by a harvesting wire and to then return seeded cartridges into empty tiers from which the harvestable cartridges came. In such embodiment, a harvesting wire is a taut metal wire that rotates and cuts through the base of plants in order to separate the tops of the plants from their roots. The harvesting station is embodied in detail in FIG. 6 and refers to the parts of a farm that are responsible for interfacing with a module and removing harvestable cartridges, harvesting the plants grown in such cartridges, sending the harvested cartridges for post-harvest processing, and reinstalling seeded cartridges back into the tiers of said module for the next crop growth. In such embodiment, the vertical harvesting beams refer to the vertical beams that are connected to the harvesting arms and are responsible for moving the harvesting arms upwards and downwards for the purpose of picking up cartridges from tiers to be harvested, and returning seeded cartridges into empty tiers. The cartridge is moved from station to station inside the processing apparatus when: harvesting the current greens growing in the cartridge, cleaning the cartridge out, adding new growth media, and planting new seeds in the cartridge before it is returned to the trough in a tier of a module. The cartridge that is returned to the trough can be the same cartridge that was removed during harvesting or it could be another one pulled from a pool of ready cartridges. Movement from station to station can happen in a variety of ways. In some embodiments, the cartridge is moved using conveyor belts, pistons, and electromagnets all monitored with sensors and controlled by the farm controller system.

Numerous alternatives to this method of harvesting exist. In other embodiments, the lid of the cartridge could be built out of two parallel pieces of metal, with the same top plate holes in each, between which an air gap exists. In various embodiments, cutting instruments such as wires, blades, lasers, and other tools, are used to separate the plants from their roots during the harvesting process. Similarly, one or more cutting instruments could even be built into the lid of the cartridge and the processing apparatus could cause them to move to cut the plants. In other embodiments, mechanisms could be used to pluck the plants with or without their roots attached from the cartridge. An example of such a mechanism is a robotic arm, but more bulk methods could be employed, even flipping the cartridge upside down and using water to rinse out the growth medium which would make the plants fall out.

In an alternate embodiment, the tiers do not need to contain removable cartridges. Instead, the harvesting station could reach into each tier and execute the removal of the existing crops and planting of new ones. This could be affected in numerous ways. For example, the trough itself could contain a metal lid with holes in it similar to how the cartridge's lid is described above, and arms from the harvesting station could reach in to cut and harvest the plants, or a cutting instrument could be built into the lid and the processing apparatus triggers it to cut the plants, and then the harvesting station could remove the cut plants from the tier. This could be done in numerous ways such as using a pneumatic system attached to an arm. Planting could proceed similarly, with an arm moving from hole to hole placing the appropriate seeds in the growth medium.

In one embodiment, the cartridge first moves to a station where its existing plants are harvested from the top of the cartridge. This can be done in any number of ways. In one embodiment, a taut moving metal wire is placed across the path that the cartridge is taken through the apparatus, at a height barely above the top of the cartridge, as shown in FIG. 11 and FIG. 12. This metal wire's motion and high tension allow it to separate the greens from their roots which remain in the coir. As they are cut, the greens end up on a conveyor belt 1205, which is immediately above the wire. This conveyor moves them into a produce storage container 607, and then either to a packing station, if the crop is something like lettuce which has edible greens, or to a compost if the crop is something like potatoes which have inedible greens. In one embodiment, the produce storage container is a reusable container that harvested plants are conveyed into from the harvesting station after they have been harvested. This container stores the harvested produce until it is distributed and the container is returned to the farm after distribution to be reused again after it has been cleaned. In some embodiments, a packing station is a section of a farm where harvested greens are selected either for composting or for sale and sent either to a cooler if they are marketable or for composting if they are not marketable. A metal comb can be added right above the wire ensuring that the greens' leaves are out of the way of the metal wire so that they are not cut. In other embodiments, the coir is separated from the cartridge with the greens and roots of the greens intact, allowing plants to be harvested as a whole. This could be done, for example, by using a waterjet to clean the growth medium off of the roots. In other embodiments, the top plate separates from the cartridge, lifting the plants with the roots intact upwards, while the cartridge flips and dumps the growth medium out, with the roots then being sprayed with the waterjet to clean the roots. This would enable the harvesting of the whole plant including the roots.

In another embodiment, the plants are grown in net cups inside of the top plate, with the net cups placed inside the grow sites of the top plate. These net cups can be removed from and added to the top plate automatically. These net cups first have growth media placed inside them and then have the seeds added to them using an automatic seeding machine. Seeds are then left to germinate in their net cups in a germination area. Successfully germinated seeds, housed in a net cup, are transplanted mechanically into the top plate of a cartridge. In this embodiment a two-step planting process is possible where only seeds that successfully germinate are transplanted into the top plate of a cartridge that is then put into a module to grow in the growing section of a farm. This embodiment also allows for another form of harvesting of plants with roots intact, where the net cup is mechanically removed from the top plate, the growth medium is removed from the net cup, for example with a waterjet, and the plant with roots intact is transported to a packaging area. The harvesting methods mentioned previously can also be used when the plants are grown in this manner with the net cups.

In one embodiment, the cartridge then continues through the processing apparatus to the next station, the cartridge reset station, which removes the coir and the roots from the cartridge. In one embodiment, the cartridge reset station is a section of a farm where harvested cartridges have their internal growth media and roots removed from them, are cleaned, and are refilled with wet coir and sent to the seeding station to be reseeded for further growing of produce. In such an embodiment, a seeding station is a section of a farm where cartridges are seeded by an automatic seeding machine. At the cartridge reset station, the mechanical separation apparatus separates the coir from the roots that have grown inside of it. The coir is retained so that it can be reused. If the crop grown in the cartridge is something like lettuce, whose roots are not marketable, the roots are sent to a compost. If the crop grown in the cartridge is something like potatoes, whose roots are marketable, they are sent to a packing station. The cartridge reset station can operate in a number of ways. In one embodiment, the top plate of the cartridge is removed, the cartridge is flipped over, dumping the coir and roots into a mechanical separation apparatus that uses sieves and flowing water to push the finer coir into a lower level and leave the roots at a higher level of the mechanical separation apparatus.

The cartridge's bottom is then stored for reuse. In some embodiments the cartridge's bottom is immediately reused and in other embodiments it is reused for a different tier of the module or a different module entirely. The cartridge's top plate is stored separately since different top plates are used for different kinds of crops. The central control system keeps track of which kinds of cartridge bottoms and top plates are available for reuse.

In one embodiment, a cartridge is also prepared to be put into the trough that is now empty. A cartridge bottom, which may or may not be the one that was removed from the same trough, is first filled with moistened growth media at the cartridge reset station. This could be growth media that was just removed from the cartridge most recently processed, or it could come from a vat of growth media. For crops seeded with eyes, such as potatoes, seeding occurs when the eyes are mechanically mixed into the growth media. However, such crops can also be planted like seeds, for example, with an automatic seeding machine. The cartridge then has the appropriate top plate added to it.

For crops such as lettuce, the cartridge then moves to the seeding station where the central control system chooses the appropriate seed type and the automatic seeding machine places the seeds in the center of each top plate hole. Automatic seeding technology is already well known and should be readily adaptable by anyone skilled in the art.

The seeded cartridge is then moved to the empty trough of the module. In one embodiment, the harvesting station, embodied in FIG. 7, moves vertically from tier to tier, processes each tier of the module in this manner, removes the existing cartridge, harvests its contents, and replaces it with a seeded cartridge. The central control system instructs the module to return to the growing section to find an available grow station in the grid and reconnect to the water circulatory system and the electrical system to start its new growth of newly seeded crops.

The division of the processing apparatus into stations could be done in various ways by people skilled in the art. In one embodiment, removing a cartridge and harvesting the plants from such cartridge happens simultaneously. Simultaneous removing of the cartridge and harvesting is important in embodiments where there is no removable cartridge, because then the processing apparatus can perform similar tasks by reaching into the tier and pulling out a drawer, processing it and sliding it back in. Even if the cartridge is removed, various simple changes can be made by someone skilled in the art to the cartridge processing.

In one embodiment there are multiple processing apparatuses so that multiple modules can be processed simultaneously.

Figure 14:
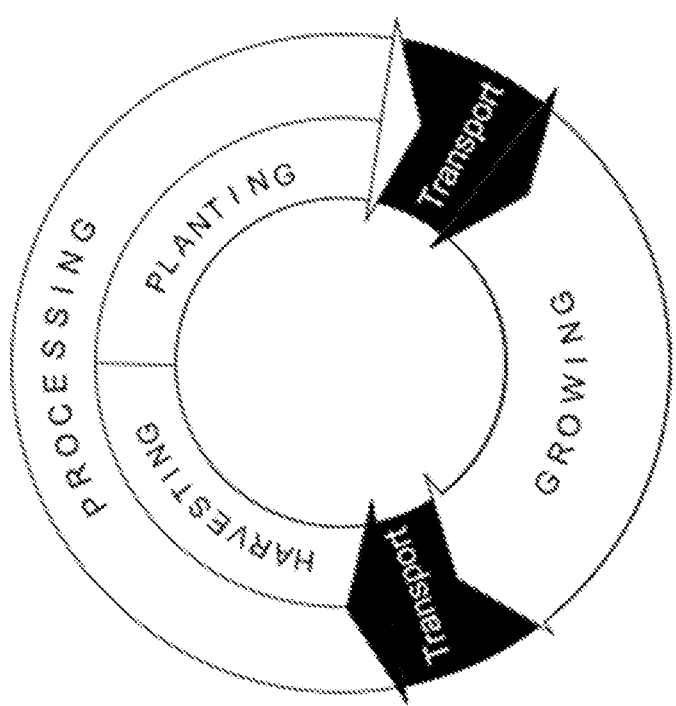
FIG. 14 is a diagram illustrating the lifecycle of a crop that is grown and harvested in a tier of one of the transportable modules of FIG. 1.

FIG. 14 is a diagram illustrating the lifecycle of a crop that is raised and harvested in a tier of one of the transportable modules of FIG. 1. The lifecycle of a crop includes five different phases; growing in the growing section, transporting from the growing section to the processing section, processing, which comprises harvesting and the planting of a new crop, followed by transporting the new crop from the processing section to the growing section.

In some embodiments, the rhythm of the farm is determined by orders which lead to automatic planting of crops in modules. This triggers a chain reaction of the transport of those modules to the growing section, the homeostatic interaction between the modules and the nutrient circulation system, and then the eventual transport of the modules to have their crops harvested and then new crops planted, which forms the crop-lifecycle of the embodiment shown in FIG. 14.

In another embodiment, the nutrient replenishment occurs via aquaponics. In this embodiment, the nutrient replenishment station comprises a fish tank which holds enough fish to produce the nutrients required. One skilled in the art of aquaponics would know the ratios of plants to fish to volume of water required, as well as preferred rates of flow. The tank can be organized in any number of ways. In one embodiment, the fish tank is composed of a single plastic container with holes placed to allow water to egress and then return. Alternatively, the fish tank can be a composite of many smaller tanks such as IPC totes or even a pool built into the floor. The nutrient replenishment station also comprises the machinery needed to feed the fish in an automated manner. In some embodiments, the machinery needed to feed the fish in an automated manner is controlled by the central control system.

Figure 15:
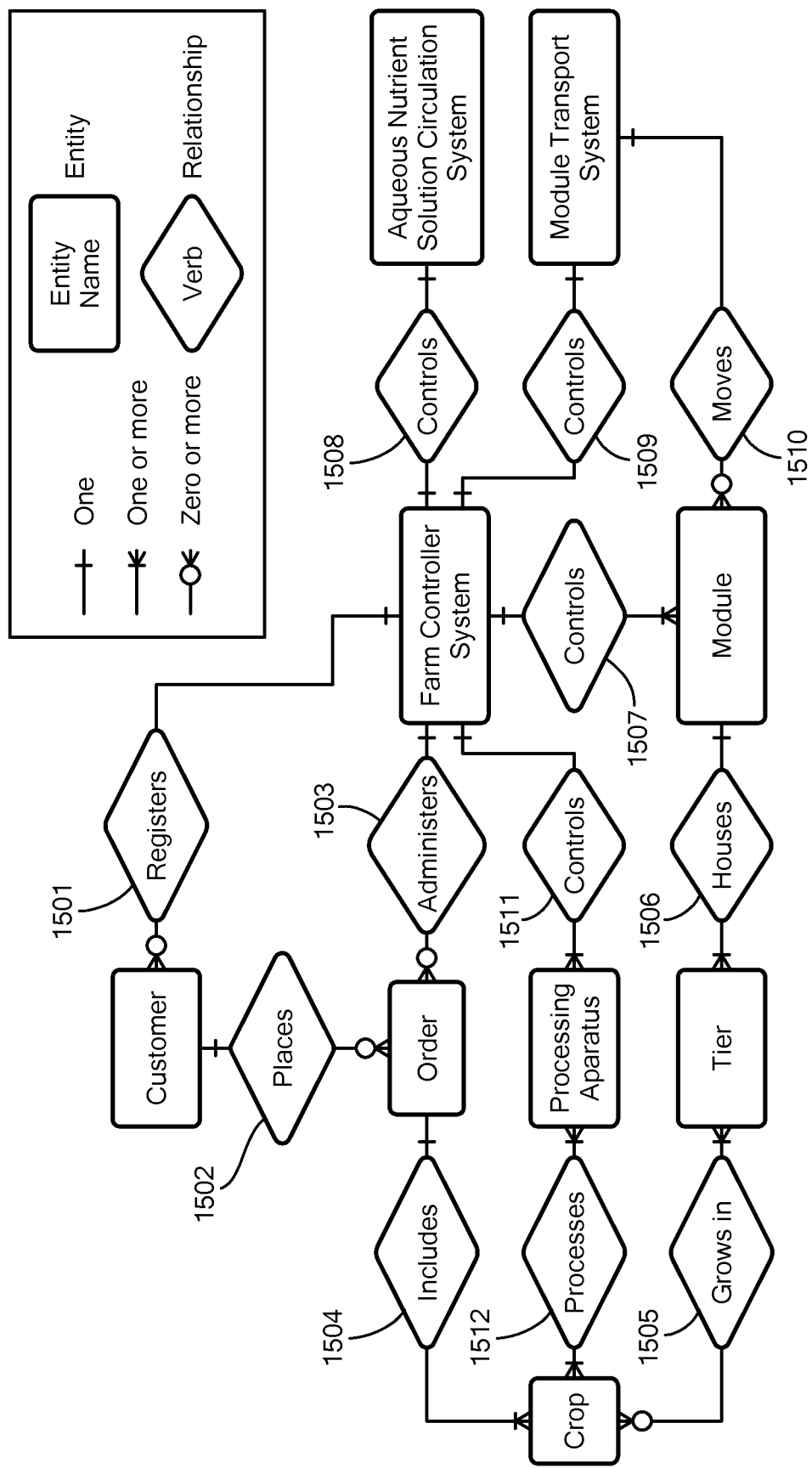
FIG. 15 is a chart showing the relationships between the mechanical and other components of the system of FIG. 1.

FIG. 15 is a chart showing the relationships between the mechanical and other components of the system of FIG. 1. Legend 1500 describes the symbolism of the chart which shows relationships between entities. Relationship 1501 shows the relationship between the farm controller entity and the farm's customers, specifically a customer can register with the one farm controller and the farm controller can have zero or more customers registered with it. Relationship 1502 shows that in one embodiment, customers place zero or more orders and each order is placed by a single customer. Relationship 1503 shows that the farm controller administers these orders, using them to guide the planting and harvesting of crops. Relationship 1504 shows that an order contains one or more crops and each crop is part of a single order. Multiple separate crops could also be grown in a single tier. In FIG. 15, crops refer to a grouping of related plants that will be processed together, rather than a species. Relationship 1505 shows that each crop is mapped to and grows in one or more farming tiers and that each tier has zero or more crops growing in it. A tier has a specific size which depends on the details of an embodiment. So, in some embodiments, a large order of crops spans numerous tiers. Similarly, if the farm is not fully booked with orders, some tiers could be empty. Relationship 1506 shows that each tier is housed in exactly one farming module and each farming module houses one or more tiers. As this diagram implies, in some embodiments, a single crop spans multiple tiers across multiple modules. Relationship 1507 shows that the farm controller controls one or more farming modules to execute the crop lifecycle for the orders that it administers. Relationship 1508 shows that the farm controller does so by controlling the farm's aqueous nutrient solution circulation system ensuring that crops are provided with the nutrients they need. Integral to the operation of some embodiments is the transport of crops that are ready to be harvested from the growing section to the processing section. Relationship 1509 shows that the farm controller controls the module transport system to make this happen according to the crops that it administers in Relationship 1503. Relationship 1510 then shows that depending on the current state of the crops and the commands sent to the module transport system, the module transport system moves zero or more modules for processing. Relationship 1511 shows that the farm controller controls the processing apparatus to process the crops from the modules once they have arrived at the processing apparatus. Relationship 1512 shows that the processing apparatus then processes the crop. As shown in the crop lifecycle Figure (FIG. 14), processing can include the harvesting of an existing crop if there is one that is ready to be harvested, and then the planting of a second crop if there is an outstanding order that requires a crop to be added to a tier.

Figure 16A:
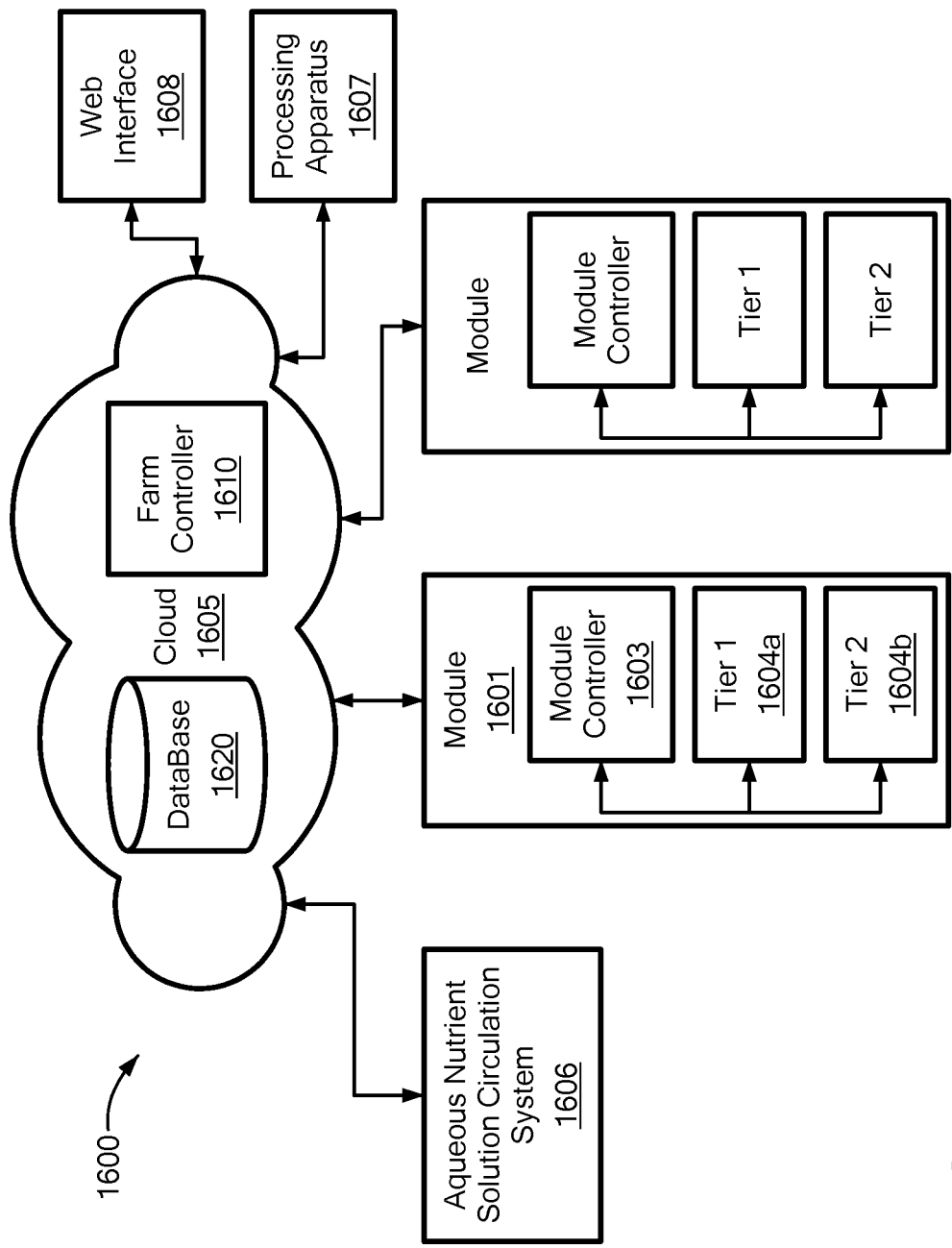
FIGS. 16A, 16B, 16C, 16D and 16E are block diagrams that show the components of vertical farming system 1600 using transportable modules in accordance with an embodiment of the present invention.

FIG. 16A is a block diagram showing the components of a vertical farming system 1600 using transportable modules in accordance with an embodiment of the present invention. In this embodiment, the farm's main controller 1610 and database 1620 are located in the cloud 1605. The database 1620 holds all the records needed to administer the vertical farming. In various embodiments the database includes, inter alia, crops mapped to orders, crops mapped to tiers across modules, modules mapped to grow stations, module transport timetables, crop life-cycle schedules, sensor data, and module traffic control data.

Farming module 1601 comprises a module controller 1603, which interacts with the cloud 1605. In some embodiments, the module 1601 receives instructions from the cloud 1605 indicative of how to proceed with operation. In some embodiments, the module controller 1603 interacts with a series of sensors, actuators, and subsystems to monitor the module's state and alter it if necessary. In various embodiments the module's sensors, actuators, and subsystems include, inter alia, USB position sensors, drive motors, battery control systems, proximity sensors, and grow station umbilical valve control systems. In various embodiments, the module's state includes the module's position and orientation, as well as its state of connection to the aqueous nutrient solution circulation system. In various embodiments the cloud 1605 communicates to the module over WiFi, Bluetooth, RFID, wired connections, and other various communication methods. In some embodiments, there are a plurality of modules 1601, each having a module controller 1603 and various tiers 1604. In some embodiments, each module is different, while in another embodiment each module is identical.

In one embodiment, the module houses an onboard networking switch that networks each member of a module's set of farming tiers 1604a, 1604b to the module's module controller 1603. The network connection allows the module controller to coordinate the state and behavior of each tier according to its interactions with the Farm Controller System and Module Transport Control System present in the cloud 1605.

In some embodiments, each tier 1604a, 1604b has its own controller that interacts with a series of sensors and actuators. In various embodiments, these sensors and actuators include, inter alia, cameras, camera gantry motors, drain valves, ingress flow sensors, normal egress flow sensors, drain egress flow sensors, water temperature sensors, air temperature sensors, nitrate sensors, water depth sensors, door motors, grow lights, airstones, and oxygen sensors. The sensors and actuators monitor the tier's state and execute its state changes. In various embodiments, the sensors and actuators can, for example, have nutrient rich water reach the crops in its cartridge, drain for transport, etc. In some embodiments, the tier's controller records and sends, to the cloud database, a steady stream of sensor data, including media from the tier's camera, the position of which is controlled by the tier's controller such that it can, for example, focus on and capture media of each plant that is being grown in such tier.

The cloud 1605 is also connected to the Aqueous Nutrient Solution Circulation System 1606. In some embodiments the Aqueous Nutrient Solution Circulation System has a controller. The cloud 1605 uses this connection to coordinate the state of modules with the state of the farm's numerous grow stations. Grow stations are where the modules grow their crops. In various embodiments, the farm controller 1610 in the cloud ensures that a grow station umbilical valve is open and allowing water to flow out and into a module's arterial receiving pipe when a module is positioned properly and is in the proper state to accept the flow of the aqueous nutrient solution. The farm controller 1610 then instructs the nutrient-depleted water to be pumped back up from the bottom tier of each module via each module's venous return pipe, dumping this water into the venous circulatory system's pipes, as well as recharging the module's batteries using the electrical connection point.

The farm controller system (alternatively known as the farm controller and the central control system) also has a schedule for the feeding and care of the fish being used as the aquaponic heart of the nutrient replenishment station and coordinates the actions of the aqueous nutrient circulation system controller to affect their feeding and care.

In one embodiment, when the farm controller 1610 determines that a module should move and where it should move to, coordination occurs via those cloud systems between the aqueous nutrient solution circulation system 1606 and the module controller 1603 to drain the module and then disconnect it from the electrical system and water circulation system at its grow station so that it can move independently without any aqueous nutrient solution being spilled.

In one embodiment, when the farm controller 1610 determines that a specific set of crops should be harvested, the farm controller system in the cloud, via the module transport control system, controls the flow of module traffic from the farm's growing section to the farm's processing section by instructing the modules which those crops are mapped to in its database to disconnect from the aqueous nutrient solution circulation system 1606 and move to the farm's processing apparatus 1607.

FIGS. 16A, 16B, 16C, 16D and 16E are block diagrams that show the components of vertical farming system 1600 using transportable modules in accordance with an embodiment of the present invention. FIG. 16A shows the vertical farming system 1600 and FIGS. 16B-16E show various components within vertical farming system 1600 in greater detail.

In the embodiment of FIG. 16A, the processing apparatus 1607 is controlled by its own controller that is connected to the farming controller system via a wireless network connection. This allows the farming controller in the cloud 1605 to coordinate the harvesting and replanting process on a module once the module's controller 1603 informs the module transport control system in the cloud that it has arrived at the processing apparatus, according to its onboard sensors. Arrival can be verified by the sensors of the processing apparatus according to coordination mediated by the farming controller system. The processing of the module is carried out, with the processing apparatus's controller 1607 coordinating the operations of each of its substations.

Once the processing apparatus 1607 has completed the processing of a module, including potentially the planting of a new crop according to instructions from the farming controller system in the cloud, it informs the farming controller system that the module is ready to move back to the growing section. The farming controller system and module transport control system control the flow of module traffic in the farm and instruct the newly-processed module's controller to return to the growing section and connect to a grow station that the farm controller system determines to be free. Once the module controller 1603 informs the farming controller system and module transport control system that it has arrived, according to its sensors, the farm controller system coordinates the module's reconnection to the electrical system and water circulation system at the free grow station by interacting with the module controller 1603 and the aqueous nutrient solution circulation system controller 1606.

While the majority of the farm's operations are completely automatic, controlled by the farm controller system, one embodiment of the present invention also includes a web interface 1608, which connects to the farm controller system. This interface allows customers to place and view their orders, and also allows farm personnel to monitor the state of the system and override the state and operations of any aspect of the system. The embodiment of FIG. 16A shows each system, 1601, 1606, 1607, and 1608 connected via the cloud, however, in various embodiments, various systems connect directly with each other.

Figure 16B:
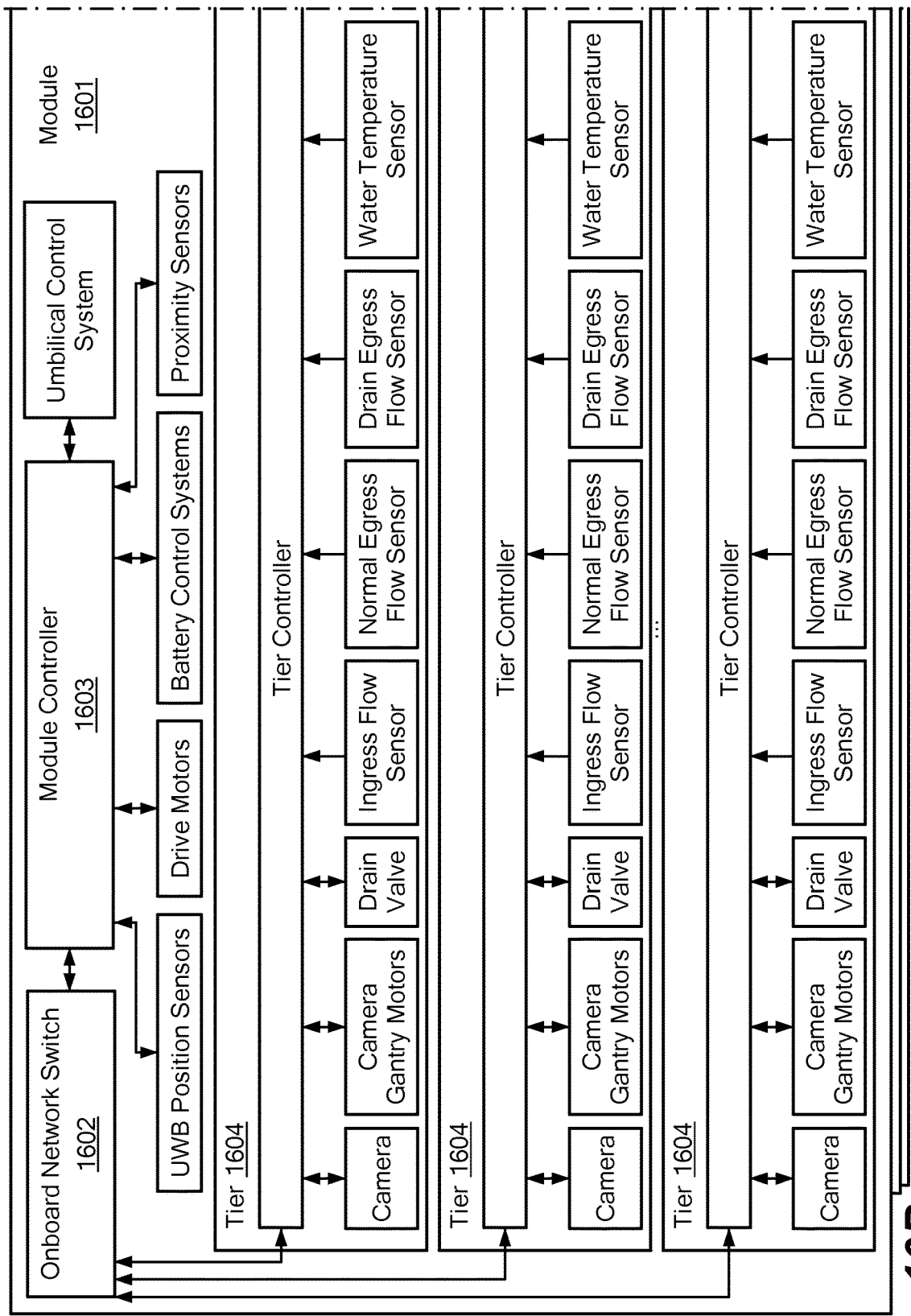
Figure 16B:
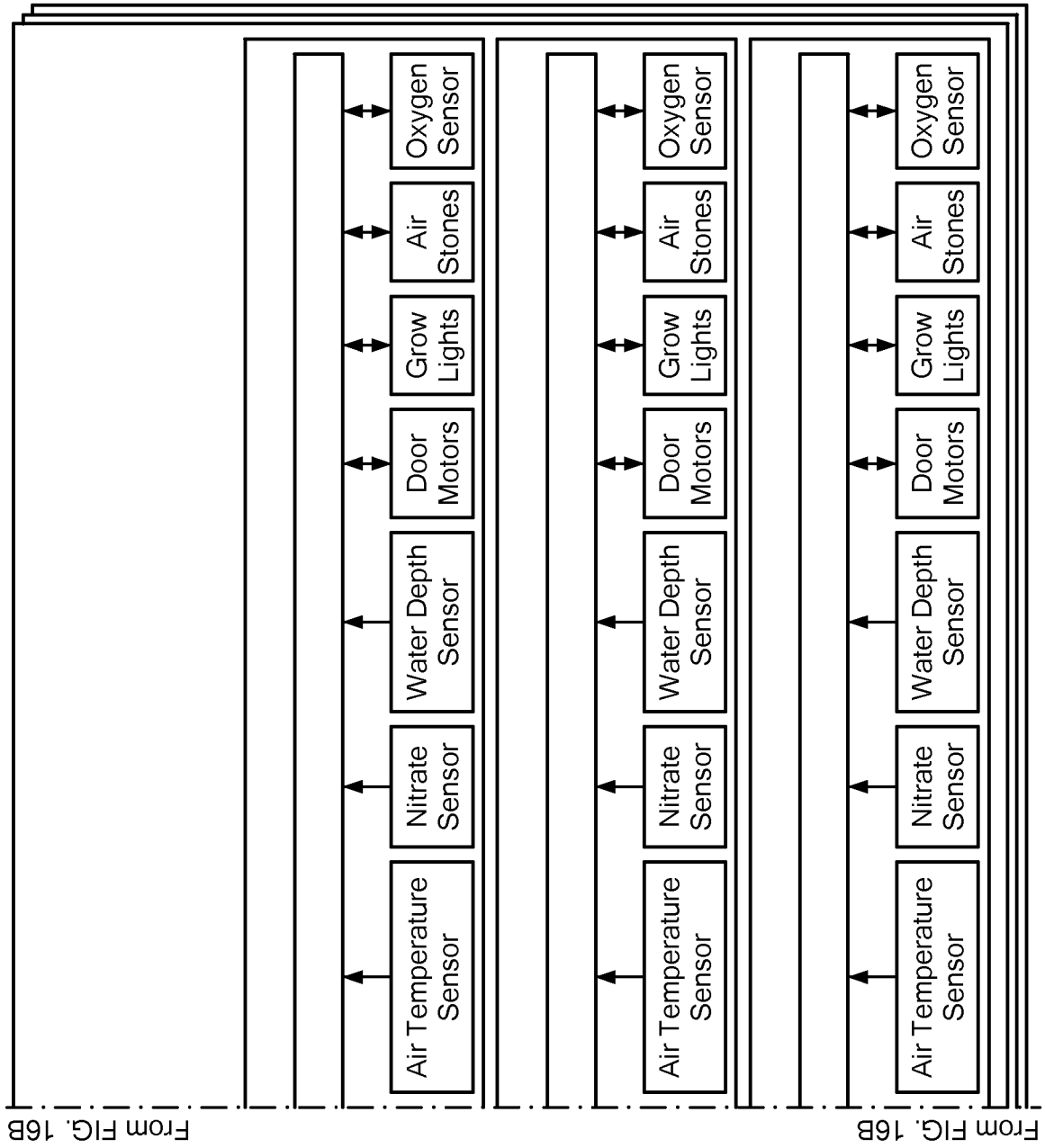

FIG. 16B is a block diagram showing module 1601 of vertical farming system 1600. The farm's set of farming modules 1601 comprise a module controller 1603. In some embodiments, the module controller 1603 communicates with the cloud 1605 over a wifi connection. In various embodiments, the module controller communicates with a LAN cable, RFD, bluetooth, and other types of connections. The module controller 1603 interacts with a series of sensors, actuators, and subsystems to monitor the module's state and affect changes to it, including the module's position, orientation, and its state of connection to the aqueous nutrient solution circulation system. The module controller 1603 acts according to the instructions it receives across its connection with the farm controller system and module transport control system.

The module 1601 also houses an onboard network switch 1602 that networks each member of a module's set of farming tiers 1604 to the module's module controller 1603. This network connection allows the module controller to coordinate the state and behavior of each tier according to its interactions with the farm controller system and module transport control system in the cloud 1605.

Each tier 1604 has its own controller that interacts with a series of sensors and actuators that allow the tier to monitor its state and execute changes such as: having nutrient rich water reach the crops in its cartridge, draining for transport, etc. The tier's controller also records and sends to the cloud database 1620 via the module controller's wifi connection, a steady stream of sensor data, sometimes including media from the tier's camera, the position of which is controlled by the tier controller so that it can, for example, focus on and capture each plant that is being grown in the tier.

Figure 16C:
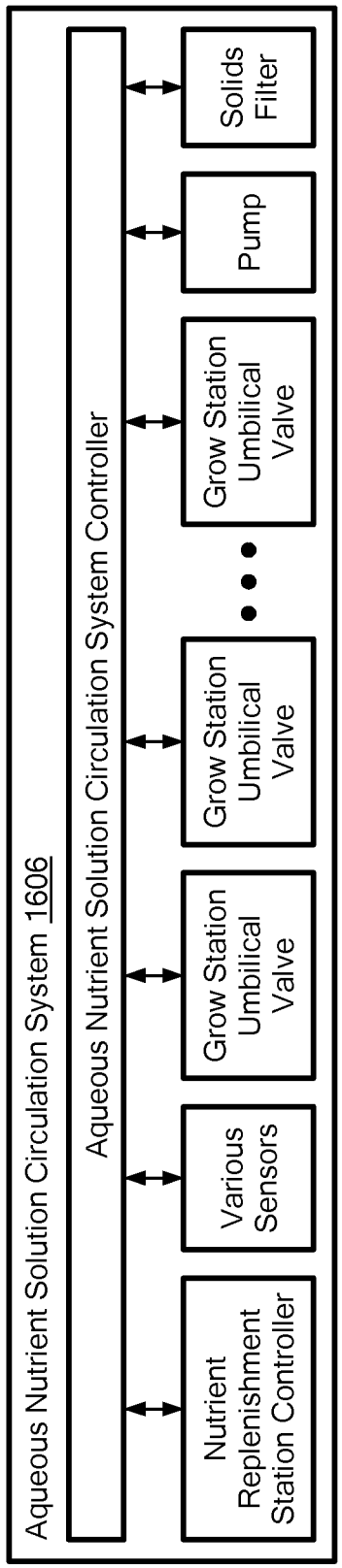

FIG. 16C is a block diagram showing aqueous nutrient solution circulation system 1606 of vertical farming system 1600. In some embodiments, the aqueous nutrient solution circulation system 1606 is connected via wifi to the cloud 1605. The farm controller 1610 uses this connection to coordinate the state of modules with the state of the farm's numerous grow stations. Grow stations are locations in the farm where modules 1601 connect to the electrical system and water circulatory system allowing modules to grow their crops. In this way the farm controller 1610 ensures that a grow station umbilical valve is open and allowing water to flow out and into a module's arterial receiving pipe when a module is positioned properly and is in the proper state to accept the flow of the aqueous nutrient solution, and then to pump the nutrient-depleted water back up from the bottom tier of each module via each module's venous return pipe, dumping this water into the venous circulatory system's pipes, as well as recharge the module's batteries using the electrical connection point.

The farm controller system also has a schedule for the distribution of feed and supplements, and care of the fish being used as the aquaponic heart of the nutrient replenishment station and coordinates the actions of the aqueous nutrient circulation system controller to affect the distribution of feed and supplements, and care.

When the farm controller 1610 and module transport control system in cloud 1605 determine that a module should move and where it should move to, coordination occurs via those cloud systems between the aqueous nutrient solution circulation system controller 1606 and the module controller 1603 to drain the module and then disconnect it from the electrical system and water circulation system at its grow station so that it can move independently without any aqueous nutrient solution being spilled.

When the farm controller system's schedule determines that a specific set of crops should be harvested, the farm controller system, via the module transport control system in the cloud 1605 controls the flow of module traffic from the farm's growing section to the farm's processing section by instructing the modules, which those crops are mapped to in its database, to disconnect from the aqueous nutrient solution circulation system 1606 and move to the farm's processing apparatus 1607 as shown in FIG. 16C.

Figure 16D:
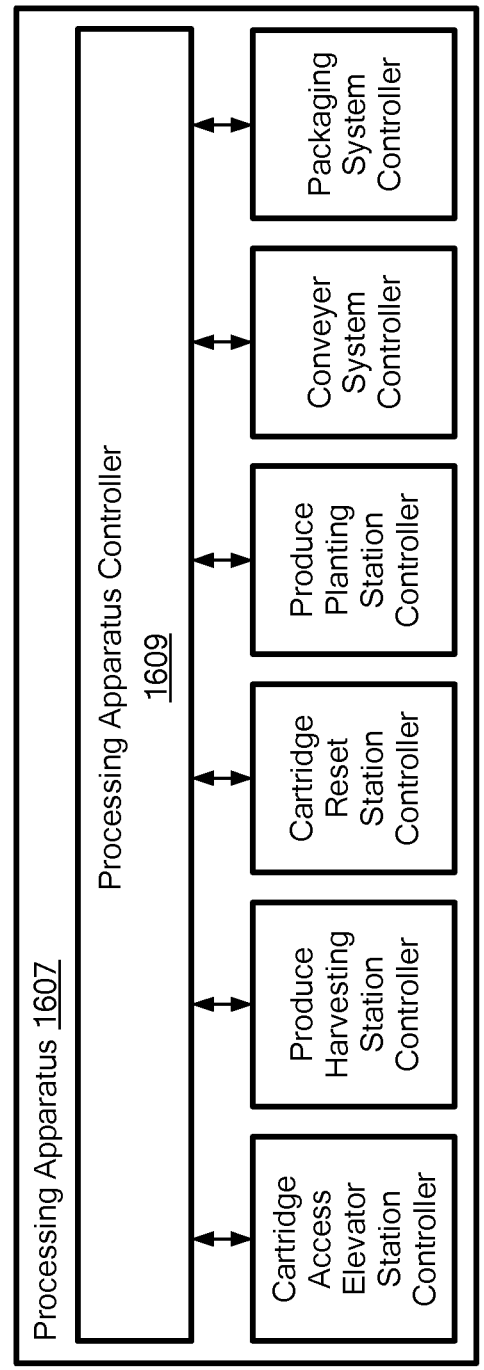

FIG. 16D shows that the processing apparatus 1607 is controlled by the processing apparatus controller that is connected to the farm controller system via a connection. This allows the farm controller 1610 to coordinate the harvesting and replanting process of module 1610 once the module's controller 1603, shown in FIG. 16A, informs the module transport control system in the cloud 1600 that it has arrived at the processing apparatus according to its onboard sensors. This can be verified by the sensors of the harvesting apparatus according to coordination mediated by the farm controller system. The processing of the module can then proceed as described elsewhere in this document, with the processing apparatus controller 1609 coordinating the operations of each of its substations.

Once the processing apparatus controller 1609 has completed the processing of a module, including potentially the planting of a new crop according to instructions from the farm controller system in the cloud 1605, it informs the farm controller 1610 that the module is ready to move back to the growing section. The farm controller 1610 and module transport control system in the cloud 1605 then control the flow of module traffic in the farm and instruct the newly-processed module's controller to return to the growing section and connect to a grow station that the farm controller system determines to be free. Once the module controller 1603, as shown in FIG. 16A, informs the farm controller 1610 and module transport control system that it has arrived, the farm controller 1610 coordinates the module's reconnection to the electrical system and water circulation system at an available grow station. In some embodiments, the module controller 1603 uses a plurality of sensors to determine when the module has arrived at the grow station.

In some embodiments, the majority of the farm's operations are completely, automatic, controlled by the farm controller 1610 in the cloud 1605. However, these embodiments include a web interface 1608 that connects to the farm controller system in the cloud 1600. This interface allows customers to place and view their orders, and also allows farm personnel to monitor the state of the system and potentially override the state and operations of any aspect of the system.

Figure 16E:
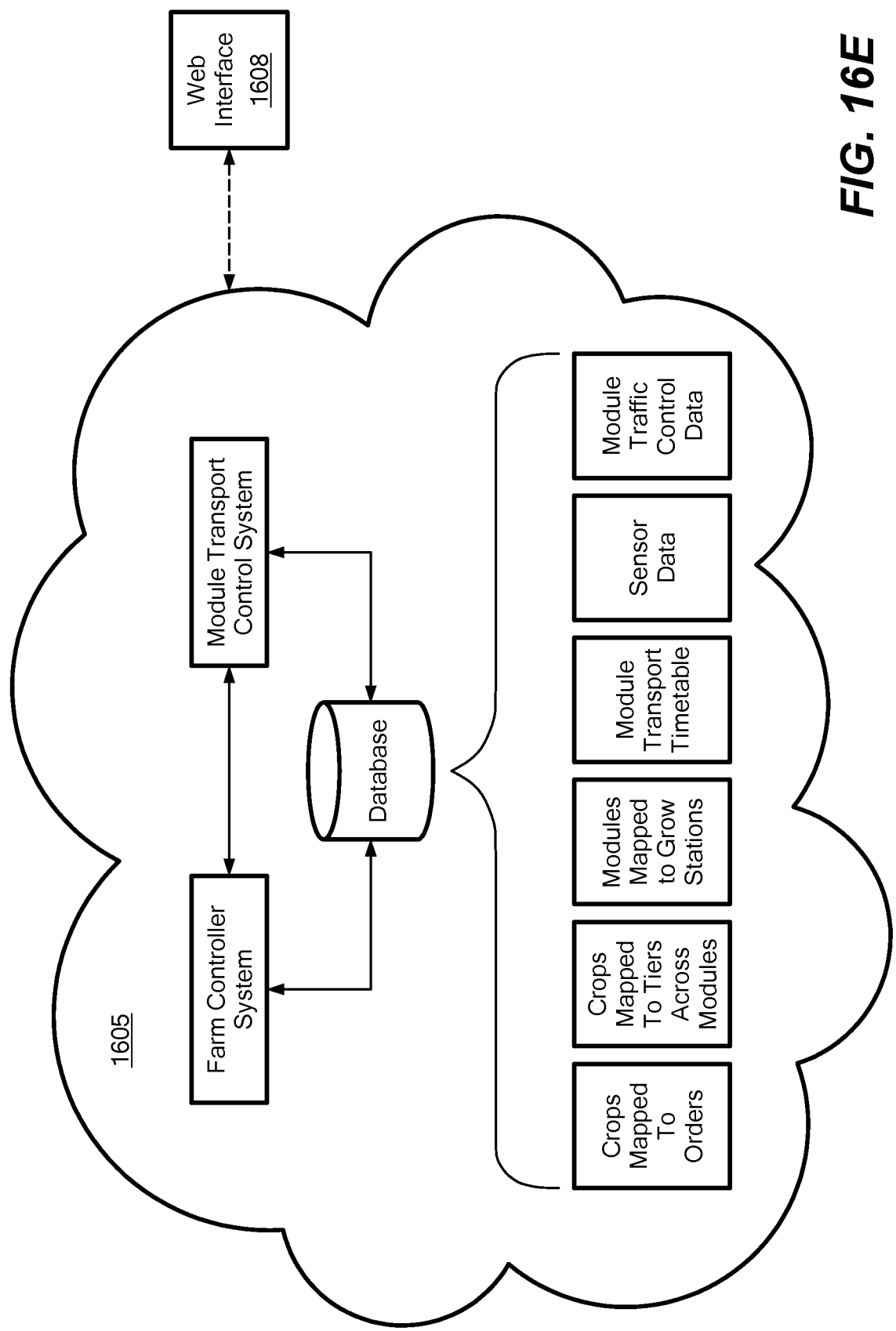

FIG. 16E is a block diagram showing cloud 1605 and web interface 1608 of vertical farming system 1600. The cloud 1605 comprises a farm controller system and module transport control system, each connected to a database 1620. The database 1620 provides the farm controller system with access to data indicative of the crops and historical data, which helps the farm controller system know, inter alia, when to begin harvesting, moving, planting, and lighting the crops. In various embodiments, the database 1620 comprises data relative to various aspects of the farm. In some embodiments the farm controller system and module transport system are run as one unit. In one embodiment the cloud 1605 is a computer within the farm.

Web interface 1608 provides a user access to the database, farm controller system, and module transport control system. In some embodiments, the farm controller 1610 runs the farm automatically, but allows for access via the web interface 1608 to override the automatic control. In some embodiments, the web interface 1608 is a monitor on a computer within the farm. In other embodiments, the web interface 1608 is a website. In various embodiments, the cloud 1605 communicates with the other systems in FIG. 16A over WiFi, LAN, and other network connections.

Figure 17:
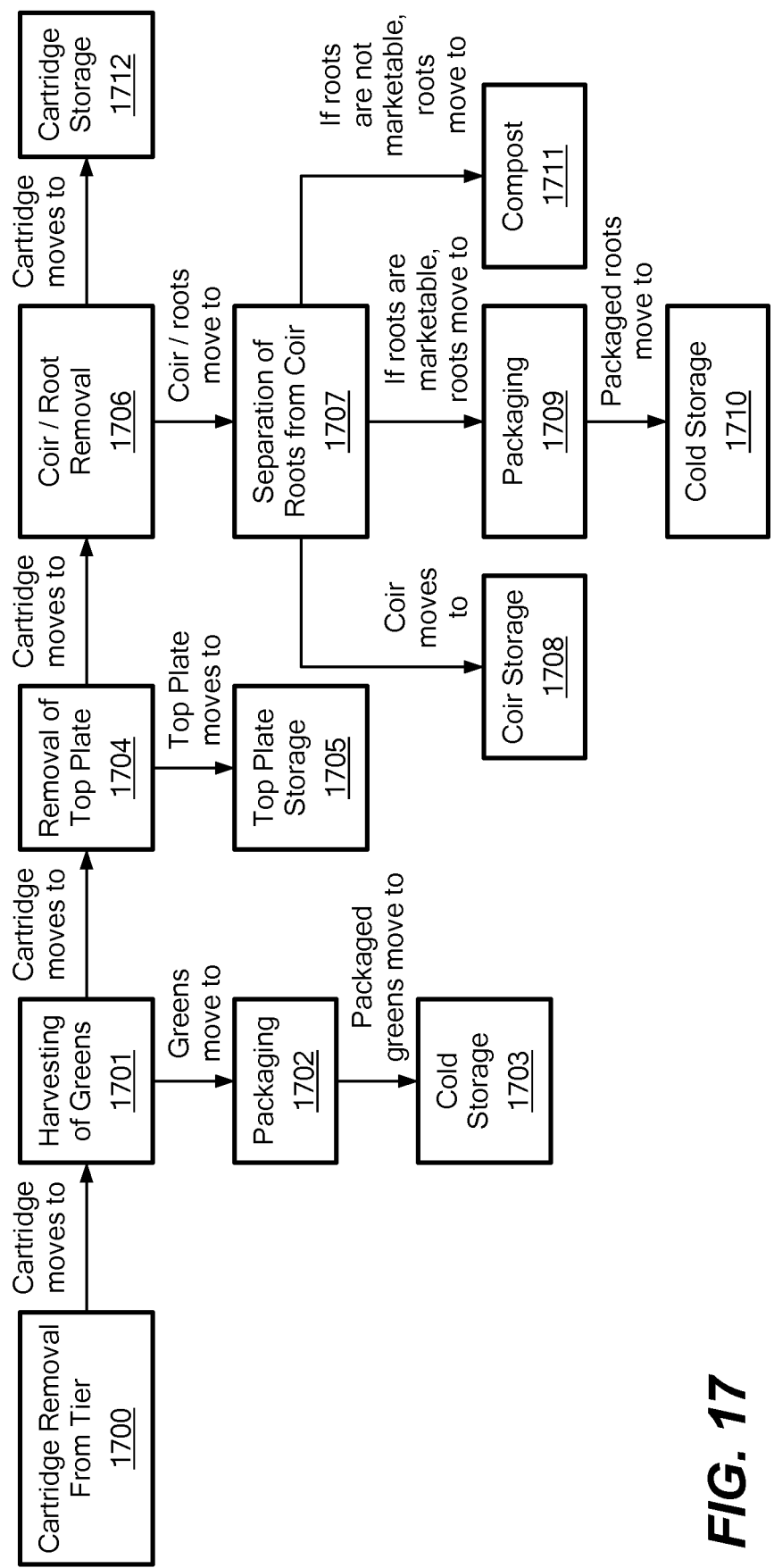
FIG. 17 is a block diagram showing a harvesting process according to an embodiment of the present invention.

FIG. 17 is a block diagram showing an embodiment of the harvesting process according to one aspect of the present invention. In this embodiment, in step 1700 a cartridge is removed from a tier and the cartridge moves to the harvesting of greens in step 1701. After the greens are harvested they move to packaging 1702 and then cold storage 1703. In step 1704, after the greens are harvested from the cartridge the top plate of the cartridge is removed and the top plate moves to top plate storage 1705. In step 1706, the cartridge then moves to the coir and root removal station where the coir and roots are removed. In step 1712, the cartridge is moved to storage. Meanwhile, the coir and roots are separated in step 1707 and the coir moves to coir storage 1708. If the roots are marketable they move to packaging 1709 and then to cold storage 1710. If the roots are not marketable they move to the compost 1711.

Figure 18:
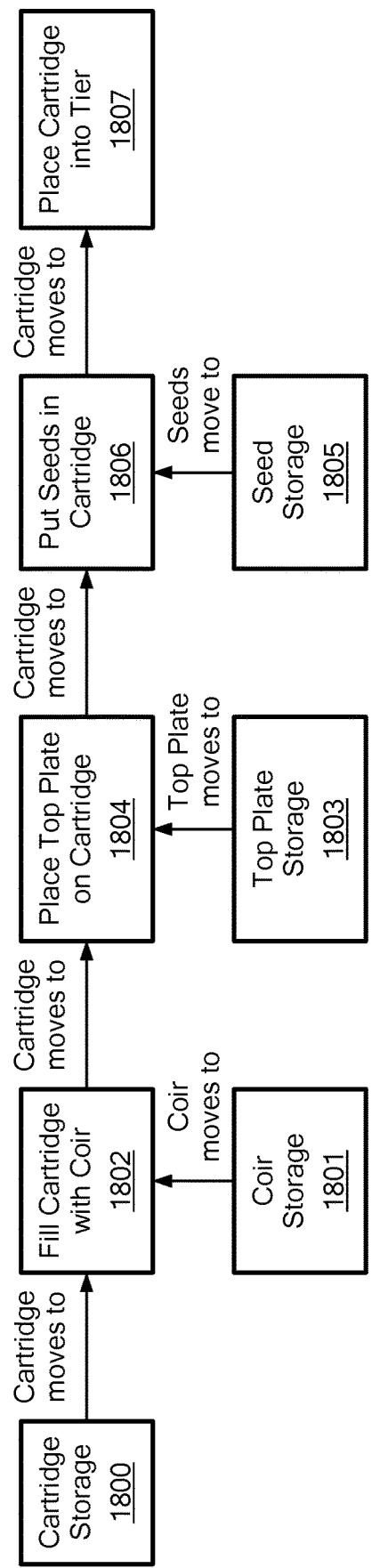
FIG. 18 is a block diagram showing a seeding process in accordance with an embodiment of the invention.

FIG. 18 is a block diagram showing an embodiment of the seeding process in accordance with one aspect of the invention. The seeding process begins with step 1800 when an empty cartridge is moved from cartridge storage and in step 1802 is filled with coir from coir storage 1801. In step 1804, the cartridge moves such that the top plate is placed on the cartridge from top plate storage 1803. In step 1806, the cartridge has seeds put into it from seed storage 1805. In step 1807, the cartridge moves to conveyor 603 and from there it is placed into a tier 1807 of a module at the harvesting station.

Figure 19:
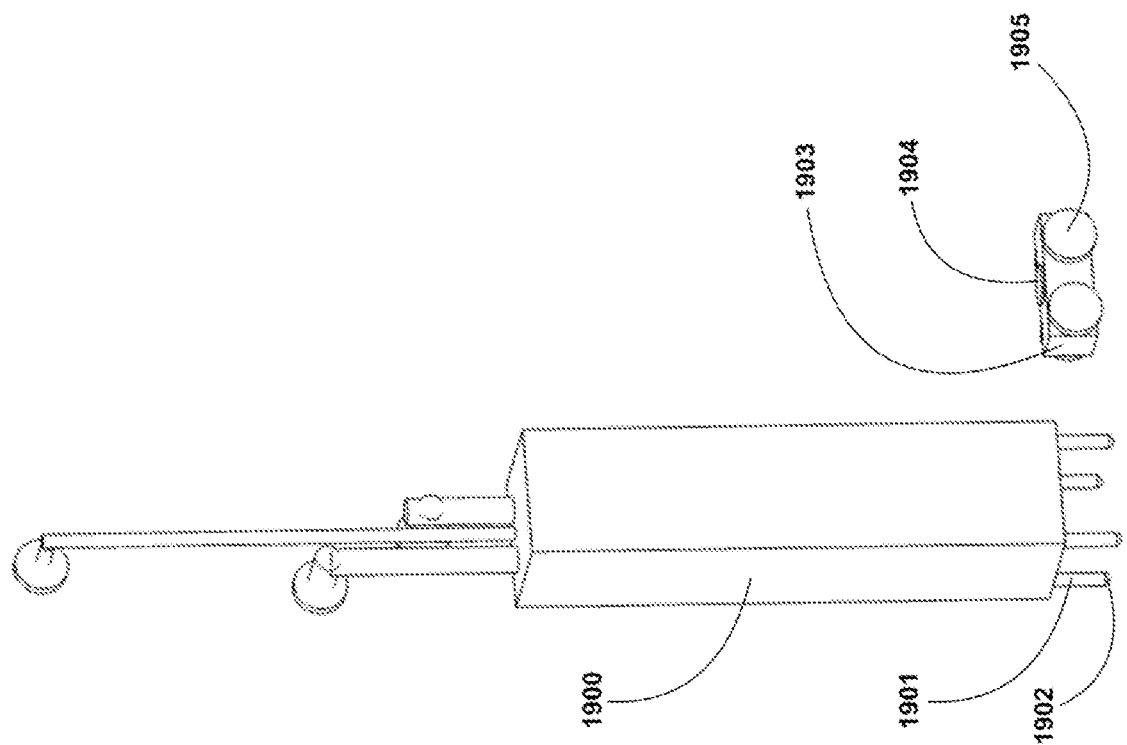
FIG. 19 is an isometric view of drive unit 1903, having drive unit connector 1904, before connecting to a module 1900 in accordance with an embodiment of the present invention.

FIG. 19 is an isometric view of drive unit 1903 connecting to a module 1900 in accordance with an embodiment of the present invention. The embodiment of FIG. 19 shows the farm's module transportation system, which includes farming module 1900 and drive unit 1903. In this embodiment, the module 1900 has elongated legs 1901 underneath which there are ball casters 1902 connected to legs 1901. In some embodiments, the ball casters 1902 enable the module to roll. Drive unit 1903 is portrayed on wheels 1905 and drive unit connector 1904, which connects drive unit 1903 to module 1900. Drive unit 1903 connects to the underside of module 1900 and enables module 1900 to move about the farm. Drive units are controlled by the central control system. In other embodiments, drive unit 1903 connects to module 1900 from above, below, around, or any combination thereof. In various embodiments, module 1900 moves about a farm via conveyors, pulleys, lifts, elevators, rails, tracks, and other modes of transportation.

In another embodiment of the invention, the drive unit 1903 is an electrically powered dolly, which transports module 1900. In some embodiments, the wheels 1904 are mecanum wheels and the drive unit connecter 1904 is a jack, which is configured to raise the dolly to a sufficient height enabling the module to be moved by the dolly. In electrically powered dolly embodiments, the modules can be on legs. As the jack raises module 1900 the legs no longer touch the ground and then move the module about the warehouse space, for example, to the harvesting station. In another embodiment, the modules are on wheels themselves. The module 1900 can include a suspension system that provides a break that is released when the weight of the module 1900 is supported by the drive unit 1903. The suspension system can include wheels or ball casters at its ends, which are designed to connect the floor. To move the module, the drive unit 1903 raises the module 1900, using a jack or other method, and supports some of the module's weight. This releases the break of the suspension system and allows movement of the module 1900 by drive unit 1903, whilst the wheels or ball casters of the module remain on the ground aiding the movement of module 1900.

In some embodiments, the drive unit 1903 is guided via guides on the floor and the module. The drive unit 1903 uses a set of sensors to determine where it is relative to the guides on the floor. In some embodiments, the drive unit 1903 works in conjunction with the farm controller to determine where it is relative to the guides. In other embodiments, the drive unit 1903 works autonomously or is controlled by a human. The drive unit 1903 can also detect its position under the module via module guides to determine the appropriate place to pick up or release the modules. One examples of guides are a set of lines on the floor, delineating paths for drive unit 1903 and a marker on the bottom of the module to delineate where the module should be before lifting. In one embodiment the redundancy of the drive unit sensing guides above and below works to ensure the drive unit is operating in the correct space. In a related embodiment, the drive unit 1903 uses indoor gps to determine its location and pathing.

Figure 20:
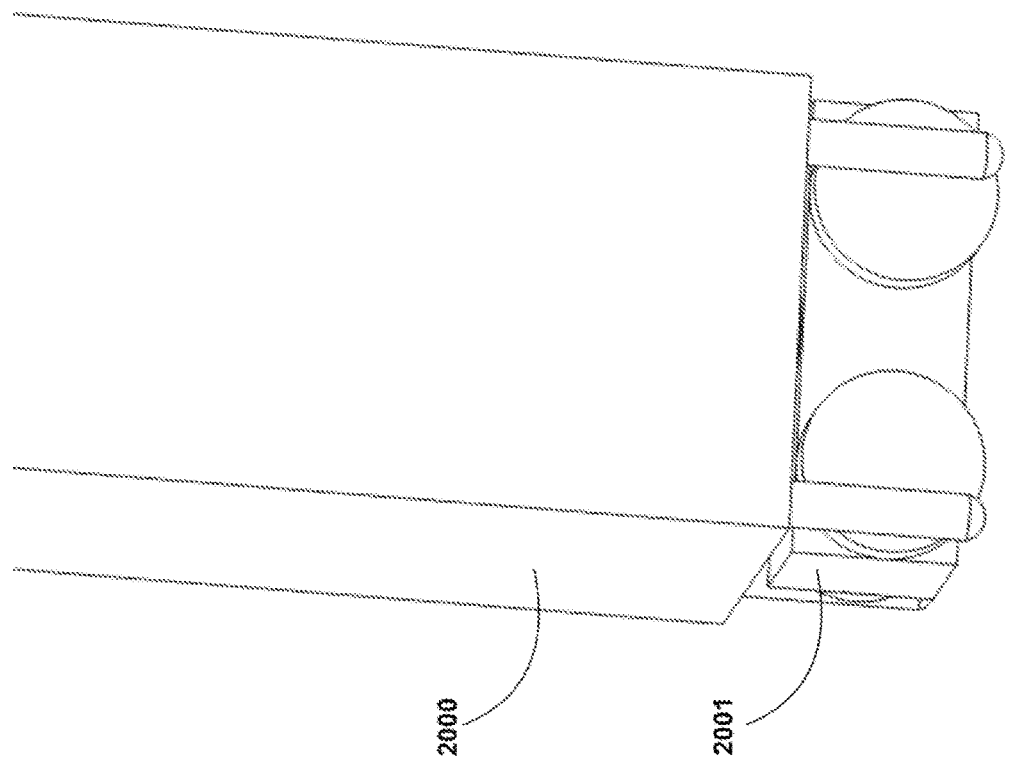
FIG. 20 is an isometric view of drive unit 1903 of FIG. 19 underneath module 2000.

FIG. 20 is an isometric view of drive unit 1903 of FIG. 19 underneath module 2000. Drive unit 2001 fits under module 2000 as it prepares to connect to it to move module 2000 about the farm.

Figure 21:
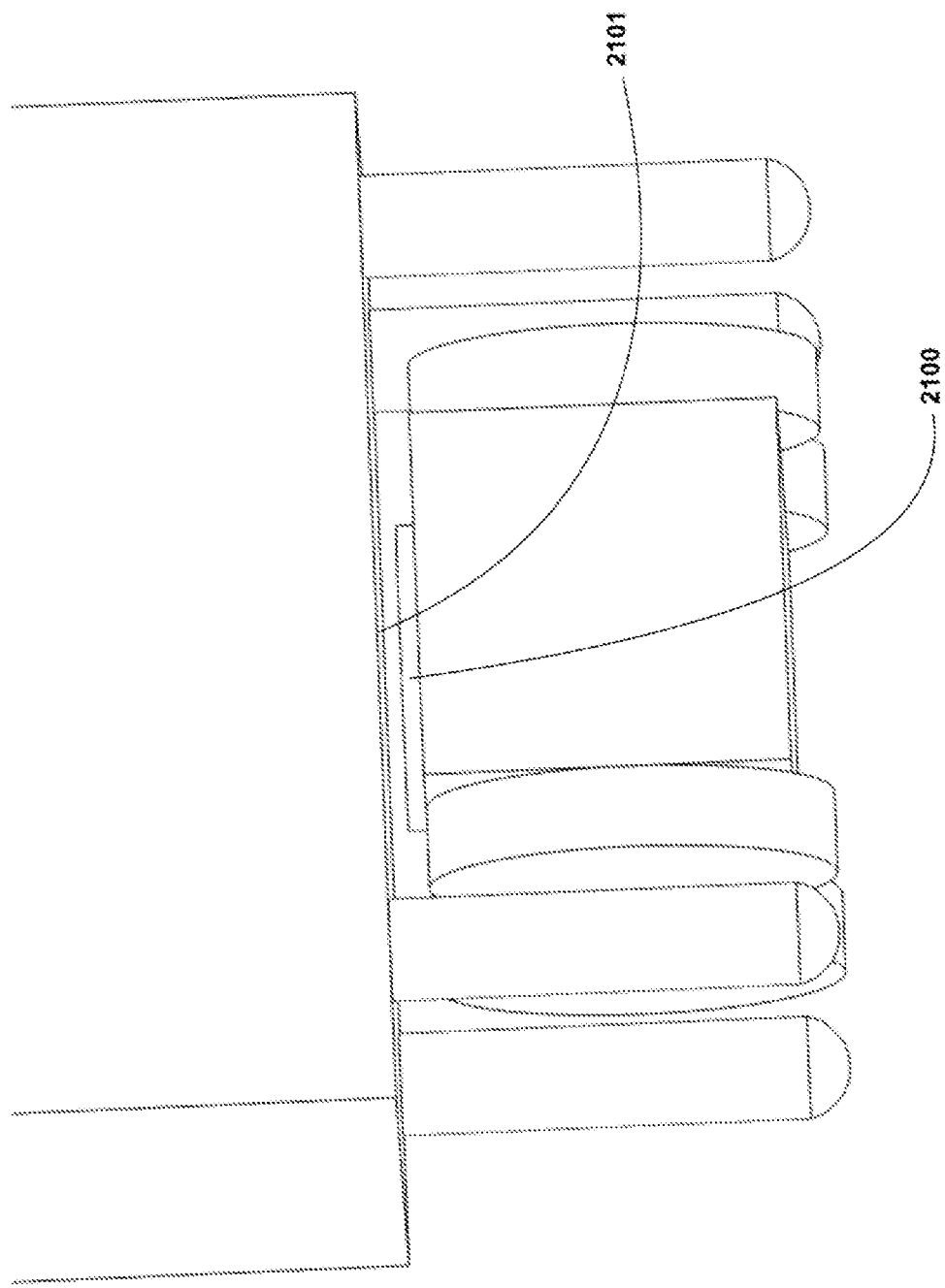
FIG. 21 is an isometric view of drive unit 1903 of FIG. 19 preparing to connect to module 2101.

FIG. 21 is an isometric view of drive unit 1903 of FIG. 19 preparing to connect to module 2101. Drive unit connector 2100 connects to the underside of the module at the module connection site 2101. In some embodiments, drive unit connector 2100 connects to module connection site 2101, which enables the module to move about the farm.

Figure 22:
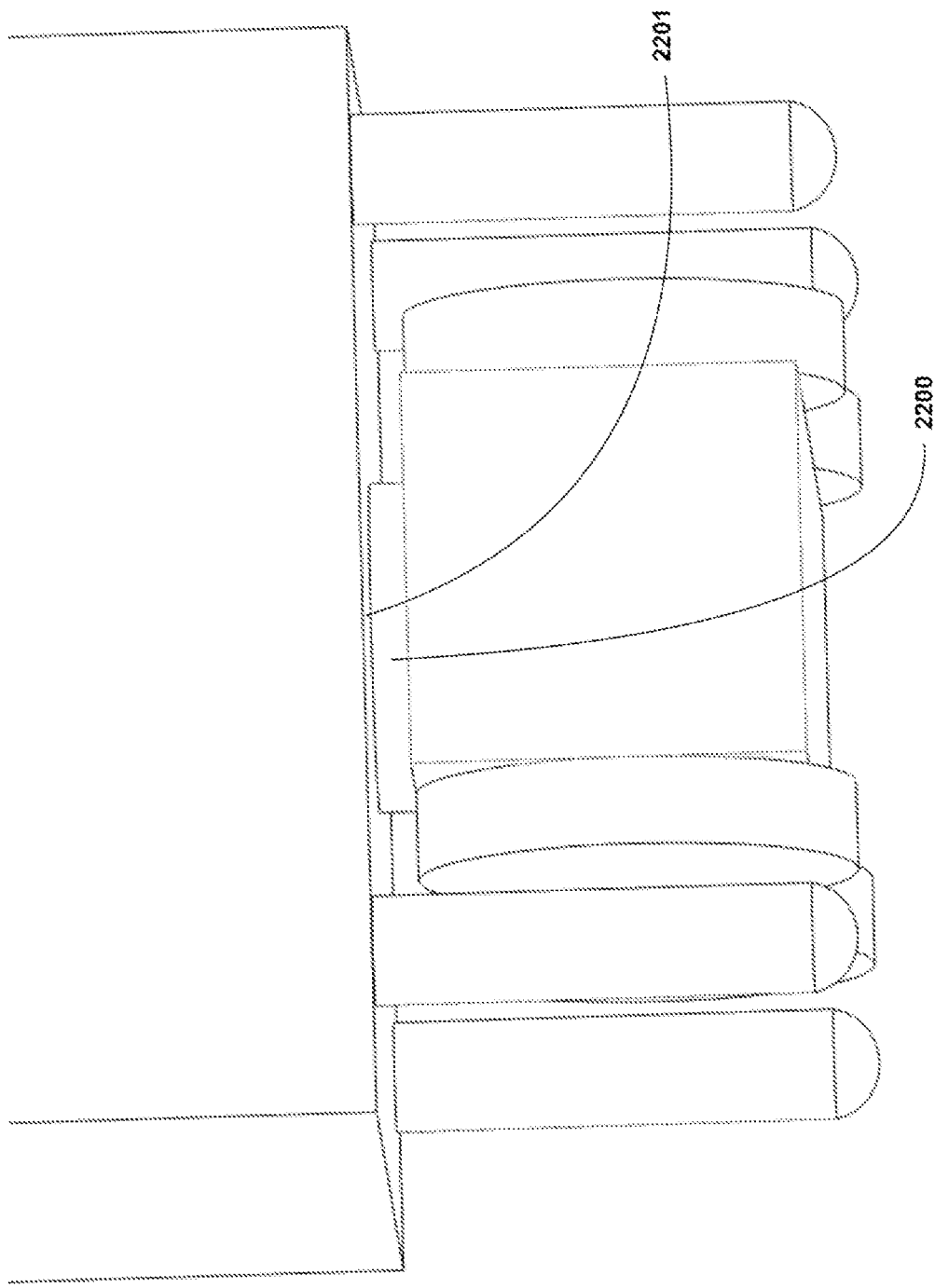
FIG. 22 is an isometric view of drive unit 1903 of FIG. 19 having its drive unit connector 1904 raised and connected with the module connection site 2201 of module 1900.

FIG. 22 is an isometric view of drive unit 1903 of FIG. 19 wherein the drive unit connector 1904 has raised and connected with the module connection site 2201 of module 1900. As shown, drive unit connector 2200 has formed a connection with module connection site 2201 enabling the module and drive unit to move together about the farm.

Figure 23A:
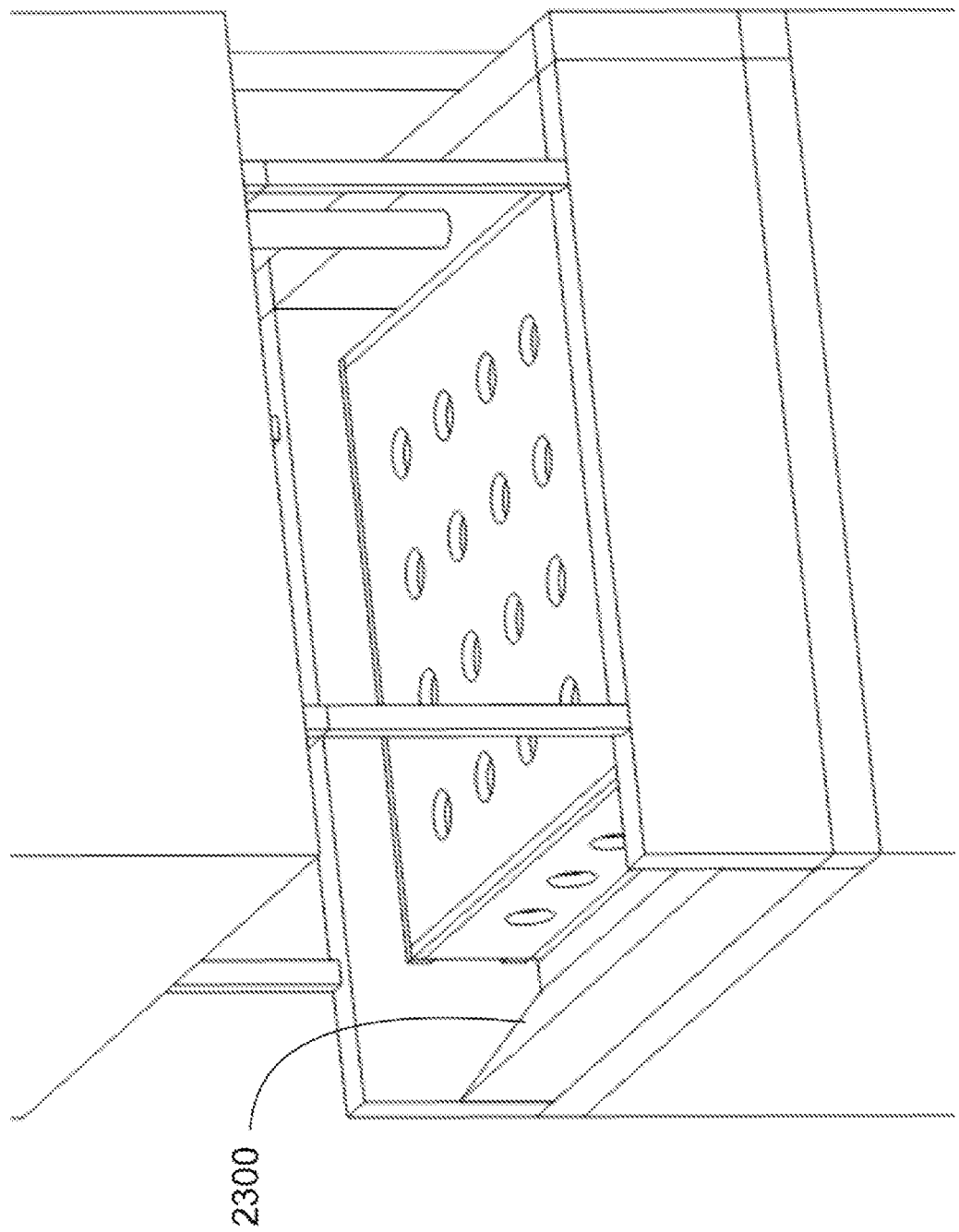
FIG. 23A is an isometric view of tier 703 wherein wall 2300 is constructed to act as a ramp for the cartridge.

FIG. 23A is an isometric view of tier 703 wherein wall 2300 is constructed to act as a ramp for the cartridge. In some embodiments a ramp is used in combination with a wall in front of the ramp. In this embodiment, the wall can also be a door. In different embodiments, the ramp provides better access for the cartridge to be removed and placed back into the tier. In some embodiments this may be due to the guided slide provided by the ramp.

Figure 23B:
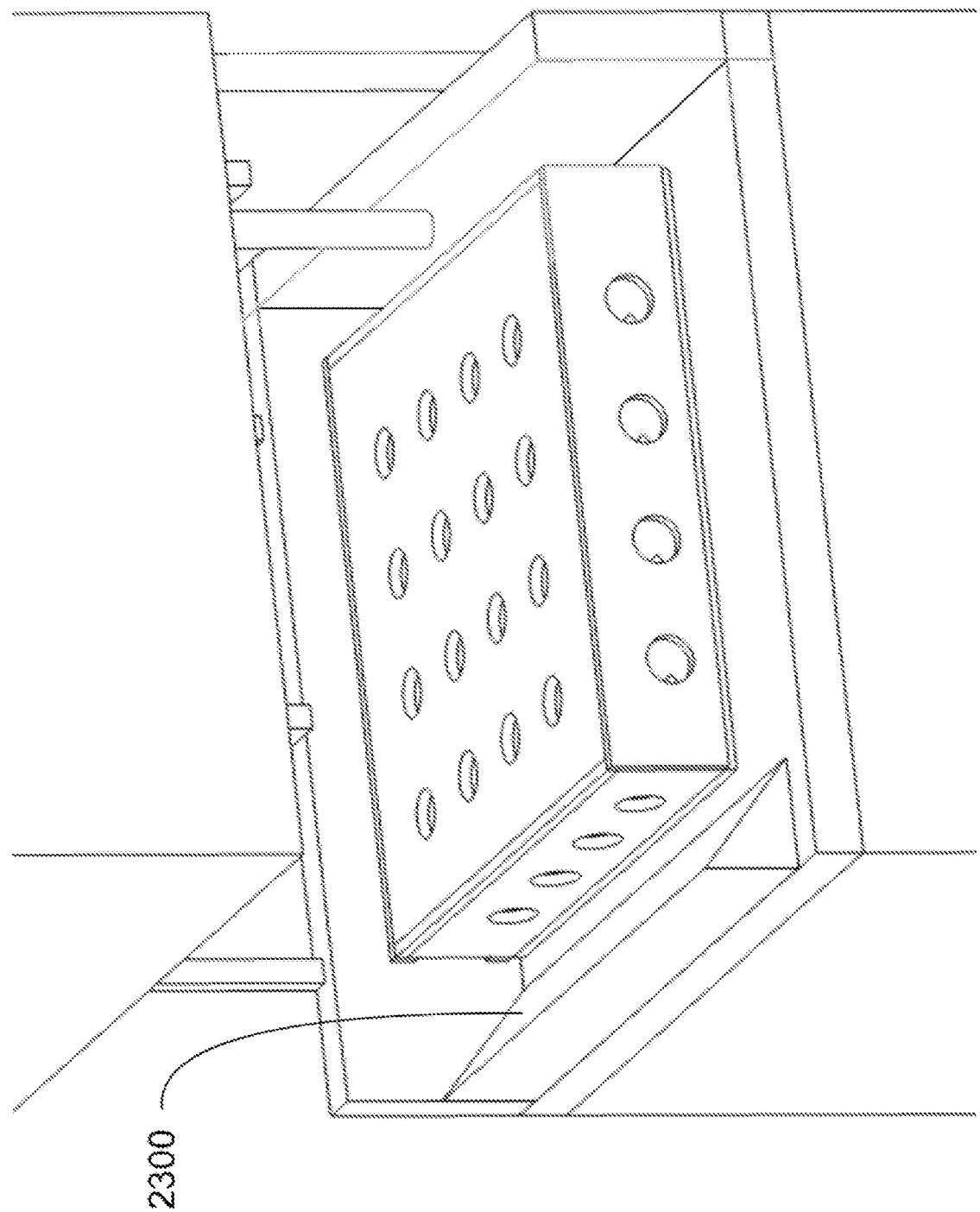
FIG. 23B is a cut-out view of tier 703 showing wall 2300 constructed as a ramp with an adjacent wall not rendered.

FIG. 23B is a cut-out view of tier 703 showing wall 2300 constructed as a ramp with an adjacent wall not rendered. In various embodiments the ramp may have different heights and angles to provide the cartridge and system with easy access to the cartridge and a wide enough gap to place the cartridge into the tier. In some embodiments, the ramp is removable.

In one embodiment, the process of coordinating the farm's operations via the central control system is mediated by the cloud. In alternate embodiments, a central control system run using computing facilities on the premises is used to coordinate the farm's operations. The central control system's processing includes the record keeping of when specific crops were planted into specific tiers. In some embodiments, this data is cross-referenced with the orders from customers that led to those crops being planted. The central control system maintains the homeostatic balance of the farm by monitoring sensors throughout the farm. Such sensors include, but are not limited to, flow rate sensors, water and air temperature sensors, pH sensors, ammonia sensors, nitrate sensors, dissolved oxygen sensors, humidity sensors, water depth sensors, voltage sensors, cameras, positioning sensors for the modules, etc. Through affecting change in the farm by activating various actuators, such as, but not limited to, electric motors, stepper motors, servos, electromagnets, motorized or solenoid based valves, pumps, etc. one skilled in the art would understand how to build the system described throughout this document using those components. In some embodiments specific interactions include the operation of a camera gantry in each tier to monitor the growth of plants and compare them to the expected growth rates of the plants, or the monitoring of the UWB positioning information. The central control system also constantly records the state of all the electronic components constantly, creating a replayable digital twin of the farm. The central control system schedules when modules move from the growing section to the processing section and organizes how the remaining modules should position themselves. It also controls which plants should be replanted based on customer orders or other inputs.

In one embodiment, the components of a farm are designed and constructed in a modular way, where sections of each whole component are built separately from each other, and then later put together to make the whole component. This embodiment enables efficient shipment of farm components and efficient construction of farm components.

In one embodiment seeds are sourced from external sellers of seeds. In another embodiment, seeds are sourced through harvesting seeds grown in the farms. In further embodiments seeds are sourced from a combination of the above two methods.

In some embodiments, experimentation of crop growth is performed through perturbation of growing condition parameters, such as water temperature, air temperature, carbon dioxide levels, water and air oxygen levels, water nutrient levels, lighting conditions, pH, air movement conditions, and other similar growing conditions. In one such embodiment cameras monitor the growth of plants in different modules, wherein each module has different growing conditions, and each generation of crop is observed and the growing conditions that produced the most optimal crop are used as the baseline growing conditions for the next generation of crops upon which further experimentation occurs. In this embodiment this process is replicated continuously with the goal of having higher crop quality and a better understanding of optimal growing conditions. This process of experimentation is utilized for all types of crops grown.

In one embodiment, visual indicators would be present on modules that signal the state of the modules, such as moving, stationary, flooding, draining, among others. In some embodiments the indicators are lights, a screen, or some other method of indicating the state of the module.

In one embodiment, aquatic species could be raised and sold in the form of aquaculture, operated either traditionally or robotically.

In one embodiment, any unusable materials produced during the operations of the farm, such a plant roots or unusable growth media, aquaculture waste or similar can be collected and either used for in farm use, or sold, for example as compost.

In one embodiment, produce is grown either for sale as whole plants, or can be processed further before sale. Crops can be processed into any number of shapes, consistencies, or combinations, with either crops only grown from the farm, or through a combination of crops grown in the farm and products brought into the farm from external locations. Any number of types of end products can be produced from crops grown in the farm, such as: spreads, flours, powders, individual chemical, mineral, or other base components, or other products. These products may be used either internally or externally. Any form of crop, either whole, unprocessed, processed, grown in the farm, or in combination of products external to the farm, can be processed or unprocessed and sold for any number of uses, such as food, medicine, material use, and any combination of the above.

In one embodiment, renewable energy producing devices are used to generate power for the farm. Such examples could include solar, wind, tidal, geothermal, hydropower, and biomass, among others.

In one embodiment, environmental water is sequestered through various combinations of rainwater collection tanks, atmospheric water conversion technology, and desalination technology to be used in the farm with or without water pumped from the surrounding water grid. Water collected independently by the farm can also be sold externally.

In one embodiment, products produced in the farm are either delivered to or picked up by external purchasers.

In another embodiment, crops are sold with the root intact or removed, and the edible roots of certain crops can also be sold. Crops are sold unprocessed or processed, and are sold either unpackaged or packaged. In different embodiments, packages such as clamshells, open, closed, semi-closed bags and other enclosing media are used to package crops. In some embodiments, crops are either processed or unprocessed and then combined with other processed or unprocessed crops and packaged in any size of container or bag, to then be sold or processed further.

In one embodiment, plants are seeded, germinate, and grow into mature plants in a single step process whereby the seeds are planted to germinate in one location and do not change location before they are harvested as full plants. In other embodiments, one could use a multi-step process where seeds are planted in one location and are left to germinate in that location, or to be immediately moved to another location, to then later be moved to one or more locations as they grow before they are then harvested, or any combination of locations and steps depending on the crop being grown.

In one embodiment, flowers, fruiting vegetables, roots and tubers, as well as leafy greens and any other crop in the known universe can be grown.

In one embodiment, harvested crops that need to stay fresh are vacuum cooled.

In one embodiment, crops that need to stay cool are immediately stored in a cooling system after harvest.

In one embodiment, the feed for the aquaponic environment is derived from either a carbon sequestration derived feed, algae or other plant based feed, insect-based feed, aquaculture-based feed, or any combination of these feeds, with feeds either being grown internally or sourced externally.

In one embodiment, there are many nutrient replenishment stations. In derivative embodiments, the nutrient replenishment stations are fish tanks.

In various embodiments, the alteration of gravity levels is simulated to improve growing conditions for the plants, through spinning to create artificially lower, higher, and combinations of lower and higher levels of perceived gravity.

In other embodiments, farms have integrated stores where customers are able to purchase crops grown on the same premises.

In other embodiments, farms consist of multiple levels, going upwards and/or downwards, each with its own set of modules, processing sections, growing sections, and aqueous nutrient solution circulation systems.

In different embodiments, there is one drive unit per module, more than one drive unit per module, and less than one drive unit per module. It is appreciated that for various farms, buildings, and layouts one having ordinary skill in the art would know the appropriate ratio of drive units to modules.

Scalability. Most embodiments of the vertical farm of the present invention scale effectively across the dimensions of available floor space through the addition of modules. Some care must be taken to ensure that the throughput of the module processing system scales along with the number of modules used in a farm as does the nutrient circulation system. Scaling various embodiments of the present invention requires scaling the module processing system and the nutrient circulation system, which often involves duplicating the components of those systems as needed. It is apparent that as the total area used for growing crops increases, so also must be increased the supply of nutrients and the throughput of components used for harvesting these crops. Increasing the supply of nutrients can be achieved, for example, by increasing the number of the nutrient replenishment stations or increasing the concentration of nutrients in existing nutrient replenishment stations (for example by increasing the number of fish in an aquaponic nutrient replenishment station). As the number of modules in the vertical farm is increased, the aqueous nutrient circulation system will similarly require scaling, for example, by increasing the number of connection points where the modules can interface with the aqueous nutrient circulation system. It will be apparent that the number of connection points where the modules can interface with the aqueous nutrient circulation system depends not only on the number of modules, but also on geometry and design of the overall system. Flooding and draining often form a part of the operational design of a vertical farming system in accordance with an embodiment of the present invention, and the number of connection points must be sufficient to support the nutrient requirements of the crops as they are flooded. Harvesting throughput, in the simplest case, can be increased by providing additional harvesting substations.

In some embodiments the system scales in the vertical direction. Vertical scaling is accomplished by adding tiers to each module. However, as tiers are added, the module may become unstable as structures whose heights exceed their base areas topple easily. One skilled in the art of mechanical engineering would know the required formulae and how they apply it to structures, such as modules. For example, to scale the preferred embodiment vertically, one may provide a larger base area of the module to increase the module's vertical height.

In one embodiment, crops are grown inside each tier of the module in a removable cartridge. In the preferred embodiment, this cartridge is roughly 4 feet square so that humans can easily reach across it from each side if they need to harvest crops from it at the harvesting station. As the module increases its base area, an increased base area of the cartridge may be used to utilize the space. In another embodiment, the single cartridge is replaced with numerous smaller cartridges so that each individual cartridge is small enough to allow for manual harvesting, e.g. roughly 4 square feet. In one example, if the base area of the module of one such scaled embodiment is 7 feet square, each tier would include a 2×2 grid of cartridges each having an area of 3 to 3.5 square feet. In an embodiment in which the modules are 25 feet by 25 feet in size, each tier can include 36 cartridges arranged in a 6×6 grid of cartridges having an area of 4 square feet. In embodiments of various scales, the combined size of all the cartridges in a tier is smaller than the base width of the module to provide room for water to flow around the cartridges and to make it easier to lift the cartridges out of the tier. By adding more cartridges in this way, the modules can be scaled to any vertical height by adjusting the base height appropriately and then using numerous cartridges that are still easily reached by the harvesting station. Smaller cartridges can be used to allow a single person to reach across them.

The module processing section of the farm also scales to accommodate the increase in vertical height. For example, when scaling the modules, the height of the elevator that removes the cartridges from the tiers needs to increase to reach all of the tiers. Similarly, in some embodiments the forklift mechanism is modified to reach each cartridge in the expanded tiers. Furthermore, the forklift mechanism's control system is modified to remove the plurality of cartridges per tier and put them onto the conveyor belt. In some embodiments, modules with a larger base area are used even if their height is not increased.

Flood and Drain Cycle. In one embodiment of the present invention, the vertical farm makes use of a flood and drain cycle whereby the crops are periodically inundated with the aqueous nutrient solution and periodically allowed to dry. During the flood period, among other things, nutrients are brought to the roots of the crop. During the drain period, among other things, oxygen is able to get to the roots of the plants. Alternatively, oxygen bubblers are employed, which add oxygen into the nutrient solution, such that the crops' roots may not need to drain for as long a time in order for oxygen to reach them. In some embodiments, enough bubblers are used so that some crops never need to drain for oxygen to reach them. The exact details of the flood and drain cycle can vary based on a number of factors and it is employed in various embodiments to balance various factors of the embodiment's specific design relative to its constraints. Flooding and draining allows some embodiments to have more or fewer fish relative to the area of crops being grown. For example, in many embodiments, the aqueous nutrient solution flows to each tier in a module one after another. In such embodiments, if the nutrient density of the aqueous solution is not high enough, then the last tier would not receive enough nutrients. Flooding and draining is used to correct this because individual tiers can be flooded or drained independently of one another by closing the drain valve in one while opening it in the other. In this way, flooding and draining can selectively bypass tiers, in some embodiments, to ensure that later tiers in taller modules still receive the required nutrients for their crops, even if the nutrient density is not high enough to feed them all at once. Similarly, if there are not enough connection points to the nutrient circulation system in a farm to service all of the modules, drained modules can be disconnected and moved out of the way to allow others to receive their required nutrients. Various embodiments can therefore achieve a balance between, among other things, the number of modules, the number of tiers per modules, the number and type of crops in each tier, the number of connections to the nutrient circulation system, and the nutrient density of the aqueous solution (which in aquaponic embodiments for example, means the number of fish and fish tanks required). In order to achieve a working balance of these factors, care must be taken that crops' roots have access to enough oxygen and nutrients. The required amounts of oxygen and nutrients should be apparent to those skilled in the art of aquaponic, hydroponic, and aeroponic farming.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A vertical farming system comprising:
    a set of transportable farming modules, each module having a plurality of vertically arranged farming tiers, each tier having a distinct aqueous input, a distinct aqueous output, and a distinct lighting system and configured:
    (i) to provide physical support for growth of a set of crops;
    (ii) to support circulation of an aqueous nutrient solution for the crops; and
    (iii) to provide lighting for the crops;
    an aqueous nutrient solution circulation system, coupled to the distinct aqueous input of each tier and the distinct aqueous output of each tier and configured to cause circulation of the nutrient solution throughout the set of tiers of the module;
    a nutrient replenishment station, coupled to the aqueous nutrient solution circulation system, configured to cause replenishment of nutrients in the aqueous nutrient solution;
    a farming module processing system, configured:
    (i) to harvest a current set of crops that has been grown in a given set of tiers of a selected module; and
    (ii) to refill the given set of tiers of the selected module with a successor set of crops;
    a module transport system, configured to support transport of the selected module from a first location to the farming module processing system for processing and thereafter to a second location; and
    a farm controller, coupled to the module transport system, the aqueous nutrient solution circulation system, and the module processing system, the farm controller configured to implement lifecycle management of each set of crops.

2. A vertical farming system according to claim 1, wherein each farming module is self-propelled and configured to move independently of any other farming module of the set.

3. A vertical farming system according to claim 1, wherein the module transport system comprises a set of drive units, wherein each drive unit is configured to load a selected one of the farming modules and to transport the selected farming module to a destination.

4. A vertical farming system according to claim 3, wherein the set of drive units has fewer members than members in the set of farming modules.

5. A vertical farming system according to claim 1, wherein the nutrient replenishment station includes a set of aquatic animals configured to cause the farming system to operate aquaponically.

6. A vertical farming system according to claim 2, wherein the nutrient replenishment station includes a set of aquatic animals configured to cause the farming system to operate aquaponically.

7. A vertical farming system according to claim 3, wherein the nutrient replenishment station includes a set of aquatic animals configured to cause the farming system to operate aquaponically.

8. A vertical farming system according to claim 1, wherein the farm controller is configured to initiate, automatically, transport of the selected module.

9. A vertical farming system according to claim 1, wherein the first location and the second location are the same.

10. A vertical farming system according to claim 1, wherein the farming module processing system is configured to separate a growth medium from a set of roots of the set of crops.

11. A vertical farming system according to claim 1, wherein the farm controller is coupled to a database that stores information regarding the lifecycle management of each of the crops in the set.

12. A vertical farming system according to claim 11, wherein the farm controller uses the information in the database to command the module transport system to move the selected transportable farming module in a manner consistent with the lifecycle management of the current set of crops growing in the selected module.

13. A vertical farming system according to claim 11, wherein the farm controller uses the information in the database to command the selected module to provide light to the current set of crops growing in the selected module in a manner consistent with the lifecycle management of the current set of crops growing in the selected module.

14. A vertical farming system according to claim 1, wherein each tier includes a set of cartridges, each cartridge including the current set of crops and a growth medium.

15. A vertical farming system according to claim 14, wherein the farming module processing system is further configured to remove a given cartridge from a given tier and to route the given cartridge to a harvesting substation selected based on the current set of crops in the cartridge.

16. A vertical farming system according to claim 1, further comprising a plurality of harvesting substations, including a given harvesting substation configured to be operated by a human.

17. A vertical farming system according to claim 16, wherein the harvesting substation is configured to be operated semi-manually by a human.

18. A vertical farming system according to claim 1, wherein the module transport system is configured to cause transport of the selected module based on a manual input.

19. A vertical farming system according to claim 1, wherein the farming module processing system further comprises a harvesting substation configured to remove at least a portion of the current set of crops from each tier.

20. A vertical farming system according to claim 1, further comprising a plurality of harvesting substations, including a given harvesting substation configured to be operated automatically.

* * * * *